United States Patent [19]
Ando et al.

[11] Patent Number: 5,679,086
[45] Date of Patent: Oct. 21, 1997

[54] HYDRAULIC CONTROL SYSTEM FOR AUTOMATIC TRANSMISSION OF AUTOMOTIVE VEHICLES

[75] Inventors: Yoriaki Ando, Nagoya; Kunihiro Kubo, Nishio, both of Japan

[73] Assignee: Nippon Soken, Inc., Nishio-city, Japan

[21] Appl. No.: 580,373

[22] Filed: Dec. 28, 1995

[30] Foreign Application Priority Data

Dec. 28, 1994 [JP] Japan .................. 6-340598

[51] Int. Cl.$^6$ ................................... F16H 5/66
[52] U.S. Cl. .................. 475/116; 475/123; 475/128; 477/131
[58] Field of Search .................. 475/116, 123, 475/127, 128, 130; 477/131, 130

[56] References Cited

U.S. PATENT DOCUMENTS

| | | | |
|---|---|---|---|
| 3,670,599 | 6/1972 | Nagamatsu | 475/128 X |
| 3,685,370 | 8/1972 | King | 475/128 X |
| 4,252,148 | 2/1981 | Fochtman et al. | 477/131 X |
| 4,462,278 | 7/1984 | Murakami et al. | 475/123 X |
| 4,856,383 | 8/1989 | Rosen | 477/131 X |
| 5,085,103 | 2/1992 | Ando et al. . | |
| 5,213,013 | 5/1993 | Fujiwara et al. | 475/123 X |
| 5,269,204 | 12/1993 | Moroto et al. | 477/131 |
| 5,291,804 | 3/1994 | Kashihara et al. | 475/127 |
| 5,429,560 | 7/1995 | VanSelous et al. | 475/128 X |
| 5,441,459 | 8/1995 | Inukai et al. | 475/123 X |
| 5,472,389 | 12/1995 | Ando et al. | 475/116 X |
| 5,556,356 | 9/1996 | Hakamada et al. | 477/130 X |

FOREIGN PATENT DOCUMENTS 1-299351  12/1989  Japan .

*Primary Examiner*—Charles A. Marmor
*Assistant Examiner*—Peter T. Kwon
*Attorney, Agent, or Firm*—Cushman, Darby & Cushman IP Group of Pillsbury Madison & Sutro LLP

[57] ABSTRACT

An automatic transmission for an automotive vehicle comprises electromagnetic valves 5A–5C activated or deactivated in accordance with a given shift schedule determined based on traveling conditions of the automotive vehicle, a plurality of planetary gear trains 4A–4C driven by an output force of an engine, a plurality of friction devices B1–B4 and C1–C3 receiving hydraulic pressure to selectively connect or fix components constituting planetary gear trains 4A–4C, and a mechanical shift valve 6A having a pair of pressure chambers 62A and 63A and plural ports 64A, 65A and 66A. Upon application of hydraulic pressure to pressure chamber 62A, a fluid communicating path is established in the shift valve 6A so as to connect brake B1 and manual shift valve 8. When hydraulic pressure is applied to both of pressure chambers 62A and 63A, pressurized oil is drained from brake B1. Supply and release of hydraulic pressure to clutches C1–C3, brakes B1–B4 and pressure chambers 62A and 63A of the mechanical shift valve 6A is controlled by electromagnetic valves 5A–5C.

21 Claims, 16 Drawing Sheets

FIG. 4

TABLE 1

| SHIFT POSITION | | C1 | C2 | C3 | B1 | B2 | B3 | B4 | GEAR RATIO |
|---|---|---|---|---|---|---|---|---|---|
| P | | | | | | | | ○ | |
| R | | | ○ | | | | ○ | ○ | |
| N | | | | | | | | ○ | |
| D | O/D | ○ | ○ | ○ | | ○ | | | 0.89 |
| | 5th | ○ | ○ | | | ○ | | ○ | 1.29 |
| | 4th | ○ | | ○ | | ○ | | | 1.38 |
| | 3rd | ○ | | | | ○ | | ○ | 2.00 |
| | 2nd | ○ | | ○ | | | | | 2.50 |
| | 1st | ○ | | | | | | ○ | 3.64 |
| II | 5th | ○ | ○ | | | ○ | | ○ | 1.29 |
| | 3rd | ○ | | | ○ | ○ | | ○ | 2.00 |
| | 1st | ○ | | | | | | ○ | 3.64 |
| L | 3rd | ○ | | | | ○ | | ○ | 2.00 |
| | 1st | ○ | | | | | ○ | ○ | 3.64 |

○ : ENGAGEMENT BY FLUID PRESSURE SUPPLY

1ST (D-1) MODE IN "D" RANGE

2ND (D-2) MODE IN "D" RANGE

3RD (D-3) MODE IN "D" RANGE

4TH (D-4) MODE IN "D" RANGE

5TH (D-5) MODE IN "D" RANGE

OVERDRIVE (O/D) MODE IN "D" RANGE

1ST (II-1) MODE IN "II" RANGE

3RD (II-3) MODE IN "II" RANGE

5TH (II-5) MODE IN "II" RANGE

1ST (L-1) MODE IN "L" RANGE

3RD (L-3) MODE IN "L" RANGE

FIG. 16

TABLE 2

| SHIFT POSITION | | ELECTROMAGNETIC VALVES | | |
|---|---|---|---|---|
| | | 5A | 5B | 5C |
| D | O/D | OFF | ON | ON |
| D | 5th | ON | ON | ON |
| D | 4th | OFF | ON | OFF |
| D | 3rd | ON | ON | OFF |
| D | 2nd | OFF | OFF | OFF |
| D | 1st | ON | OFF | OFF |
| II | 5th | ON | ON | ON |
| II | 3rd | ON | ON | OFF |
| II | 1st | ON | OFF | OFF |
| L | 3rd | OFF | ON | OFF |
| L | 1st | ON | OFF | OFF |

HYDRAULIC CONTROL SYSTEM FOR AUTOMATIC TRANSMISSION OF AUTOMOTIVE VEHICLES

BACKGROUND OF THE INVENTION

1. Field of the Invention

This invention relates to a hydraulic control system for an automatic transmission of automotive vehicles, and more particularly to an improved hydraulic control system for an automatic transmission which comprises electromagnetic valves directly controllable to realize a multi-stage speeds in a shift pattern with a simplified arrangement.

2. Related Art

Most of present-day automatic transmissions for automotive vehicles comprise a hydraulic torque converter having an input shaft to be connected to an output shaft of an internal combustion engine and a speed reduction mechanism connected to an output shaft of the hydraulic torque converter. To give a desirable rotational power to driving wheels of an automotive vehicle, the speed reduction mechanism generally comprises a plurality of planetary gear trains to change the output speed of an internal engine, wherein sun gears, pinions and ring gears of these planetary gear trains are selectively connected or fixed by friction devices, such as clutches and brakes, associated therein.

For example, Unexamined Japanese Patent Application No. HEI 1-299351 published in 1989, having a counterpart patent application issued as the U.S. Pat. No. 5,085,103, discloses a hydraulic control apparatus for automatic transmissions which includes a plurality of shift solenoid valves for controlling hydraulic engagement pressure of the friction devices using duty control when a shift is made, in order to realize smooth and quick shift changes with highly precise shock control.

However, according to the above-described conventional hydraulic control system, the number of speed stages obtainable in the so-called "D" range is up to only four of 1st through 4th speeds despite the complicatedness of its hydraulic circuit. Providing only four shiftable speeds is insufficient for automatic transmissions when the system needs to achieve the drivability satisfying many of drivers. Furthermore, such a system is not advantageous to improve the fuel consumption.

SUMMARY OF THE INVENTION

Accordingly, in view of above-described problems encountered in the related art, a principal object of the present invention is to provide an excellent hydraulic control system for an automatic transmission of automotive vehicles capable of realizing multiple (for example, more than four) shiftable speeds with a simplified hydraulic circuit arrangement.

In order to accomplish this and other related objects, a first aspect of the present invention provides an automatic transmission for an automotive vehicle comprising: a manual shift valve operable in response to a shift operation; electromagnetic valves activated or deactivated in accordance with a given shift schedule determined based on traveling conditions of the automotive vehicle; a plurality of planetary gear trains driven by an output force of an engine; a plurality of friction devices receiving hydraulic pressure to selectively connect or fix components constituting the planetary gear trains, so as to obtain a desirable driving force; a mechanical shift valve having a pair of pressure chambers and plural ports, one pressure chamber upon application of hydraulic pressure therein establishing a fluid communicating path in the mechanical shift valve based on a predetermined combination of the ports so as to connect predetermined friction devices with the electromagnetic valves or the manual shift valve, the other pressure chamber upon application of hydraulic pressure therein canceling the fluid communication path and establishing another fluid communication path in the mechanical shift valve based on another combination of the ports so as to provide a different connection between the friction devices and the electromagnetic valves or the manual shift valve; and a control means for activating and deactivating the electromagnetic valves so as to control supply or release of hydraulic pressure to or from the friction devices and the pressure chambers of the mechanical shift valve.

In a desirable mode, one pressure chamber of the mechanical shift valve has a cross-sectional area smaller than that of the other pressure chamber of the mechanical shift valve. Application of hydraulic pressure to the pressure chambers of the mechanical shift valve is controlled by the electromagnetic valves.

Furthermore, the automatic transmission may includes another mechanical shift valve having a pair of pressure chambers and plural ports, one pressure chamber upon application of hydraulic pressure therein establishing a fluid communicating path in this additional mechanical shift valve based on a predetermined combination of the ports so as to connect predetermined friction devices with the electromagnetic valves or the manual shift valve, and the other pressure chamber upon application of hydraulic pressure therein canceling the fluid communication path and establishing another fluid communication path in this additional mechanical shift valve based on another combination of the ports so as to provide a different connection between the friction devices and the electromagnetic valves or the manual shift valve.

It is preferable that application of hydraulic pressure to the pressure chambers of this additional mechanical shift valve is controlled by the manual shift valve. One pressure chamber of this additional mechanical shift valve has a cross-sectional area smaller than that of the other pressure chamber of this additional mechanical shift valve.

Still further, this additional mechanical shift valve accommodates two spools connected by means of a resilient member, one spool being shiftable in response to a pressing force acting from the one pressure chamber while the other spool being shiftable in response to a pressing force acting from the other pressure chamber. Yet further, it will be desirable that the control means activates or deactivates the electromagnetic valves using duty control.

In a practical mode of the present invention, there is provided an automatic transmission for automotive vehicles capable of establishing multiple, more than four, speeds.

Thus, a second aspect of the present invention provides an automatic transmission for an automotive vehicle comprising: a manual shift valve operable in response to a shift operation; three electromagnetic valves activated or deactivated in accordance with a given shift schedule determined based on traveling conditions of the automotive vehicle; three planetary gear trains driven by an output force of an engine; a plurality of friction devices including three clutches and four brakes receiving hydraulic pressure to selectively connect or fix components constituting the planetary gear trains, so as to obtain a desirable driving force; a first mechanical shift valve having first and second pressure chambers and plural ports, the first pressure chamber upon application of hydraulic pressure therein establishing a first fluid communicating path in the first mechanical shift valve based on a predetermined combination of ports of the first mechanical shift valve so as to connect predetermined friction devices with the electromagnetic valves or the manual shift valve, the second pressure chamber upon application of hydraulic pressure therein canceling the first fluid communication path and establishing a second fluid communication path in the first mechanical shift valve based on another combination of the ports of the first mechanical shift valve so as to provide a different connection between the friction devices and the electromagnetic valves or the manual shift valve; a second mechanical shift valve having third and fourth pressure chambers and plural ports, the third pressure chamber upon application of hydraulic pressure therein establishing a third fluid communicating path in the second mechanical shift valve based on a predetermined combination of the ports of the second mechanical shift valve so as to connect predetermined friction devices with electromagnetic valves or the manual shift valve, the fourth pressure chamber upon application of hydraulic pressure therein canceling the third fluid communication path and establishing a fourth fluid communication path in the second mechanical shift valve based on another combination of the ports of the second mechanical shift valve so as to provide a different connection between the friction devices and the electromagnetic valves or the manual shift valve; and a control means for activating and deactivating the electromagnetic valves so as to control supply or release of hydraulic pressure to or from the friction devices and the pressure chambers of the first and second mechanical shift valves.

In a preferable mode, the first pressure chamber of the first mechanical shift valve has a cross-sectional area smaller than that of the second pressure chamber of the first mechanical shift valve. Similarly, the third pressure chamber of the second mechanical shift valve has a cross-sectional area smaller than that of the fourth pressure chamber of the second mechanical shift valve. Application of hydraulic pressure to the first and second pressure chambers of the first mechanical shift valve is controlled by the electromagnetic valves, while application of hydraulic pressure to the third and fourth pressure chambers of the second mechanical shift valve is controlled by the manual shift valve.

Furthermore, the second mechanical shift valve accommodates two spools connected by means of a resilient member, one spool being shiftable in response to a pressing force acting from the third pressure chamber of the second mechanical shift valve while the other spool being shiftable in response to a pressing force acting from the fourth pressure chamber of the second mechanical shift valve. The control means activates or deactivates the electromagnetic valves using duty control.

The second aspect automatic transmission may further comprise a third mechanical shift valve having a single pressure chamber, in addition to first and second mechanical shift valves. Thus, the control means provides a total of six speeds in a same range of the manual shift valve by changing combination of activation of the electromagnetic valves.

Yet further, the manual shift valve has one range supplying line pressure to the third pressure chamber of the second shift valve and another range supplying line pressure to both of the third and fourth pressure chambers of the second shift valve.

BRIEF DESCRIPTION OF THE DRAWINGS

The above and other objects, features and advantages of the present invention will become more apparent from the following detailed description which is to be read in conjunction with the accompanying drawings, in which:

FIG. 4 is a table showing an operative relationship between respective shift positions of a shift lever shiftable across P, R, N, D, H and L ranges and corresponding operative conditions of clutches and brakes in a power train;

FIG. 16 is a table showing an operative relationship between respective shift positions of the D, H and L ranges and corresponding operative conditions of electromagnetic valves in the hydraulic control system shown in FIG. 3.

DETAILED DESCRIPTION OF THE PREFERRED EMBODIMENT

Figure 1:
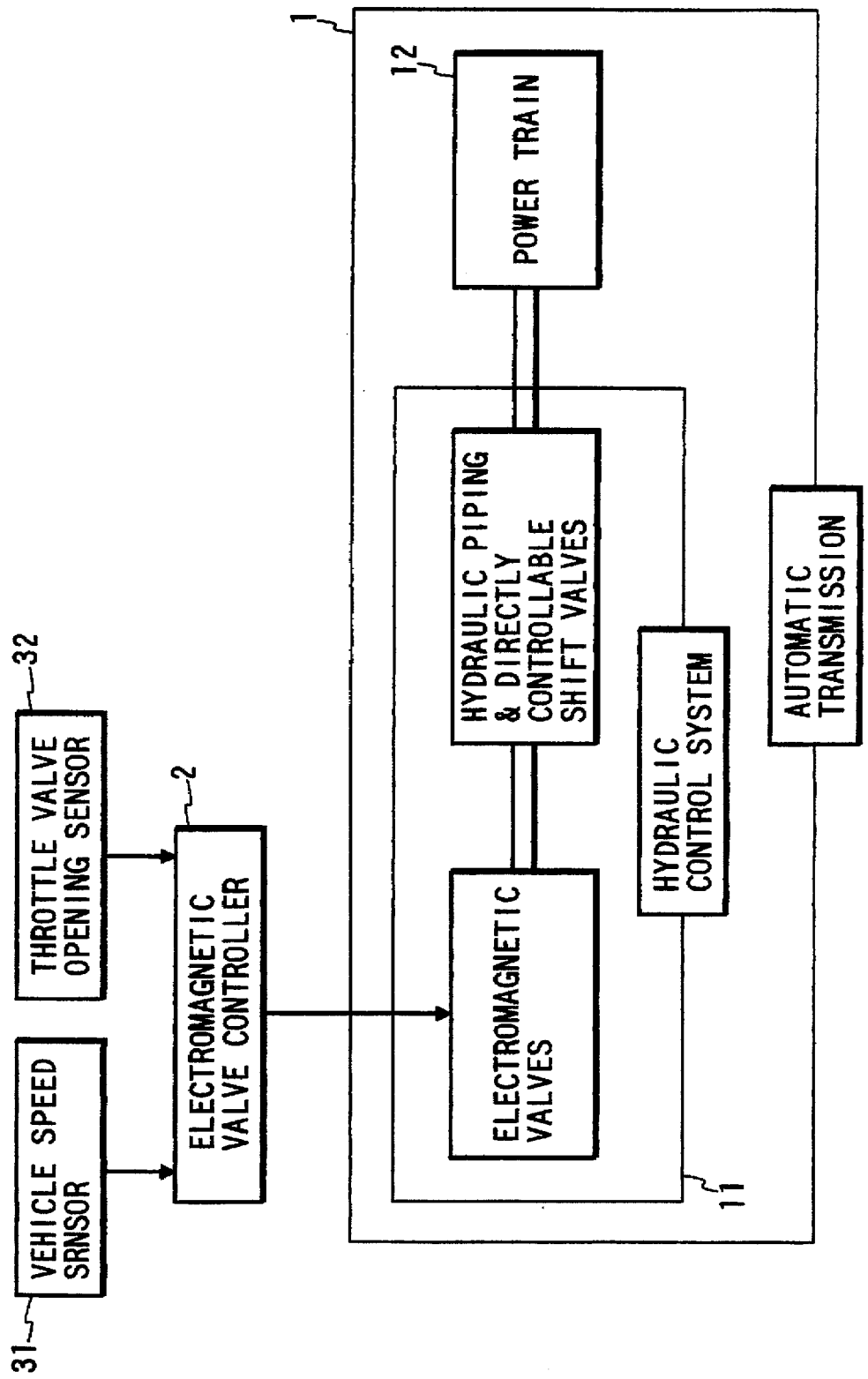
FIG. 1 is a block diagram showing an overall arrangement of an automatic transmission embodying one preferred embodiment of the present invention.

Preferred embodiments of the present invention will be explained in greater detail hereinafter, with reference to the accompanying drawings. Identical parts are denoted by identical reference numerals throughout views.

In FIG. 1, an automatic transmission 1 comprises a hydraulic control system 11 and a power train 12. The hydraulic control system 11 includes electromagnetic valves and hydraulic piping & directly controllable shift valves later described in greater detail. The electromagnetic valves are actuated in response to control signals outputted from an electromagnetic valve controller 2 which is connected to a vehicle speed sensor 31 and a throttle valve opening sensor 32 to selectively supply or release hydraulic pressure to and from the power train 12 according to a given shift schedule based on a throttle valve opening degree and a vehicle speed monitored by these sensors 31 and 32.

Figure 2:
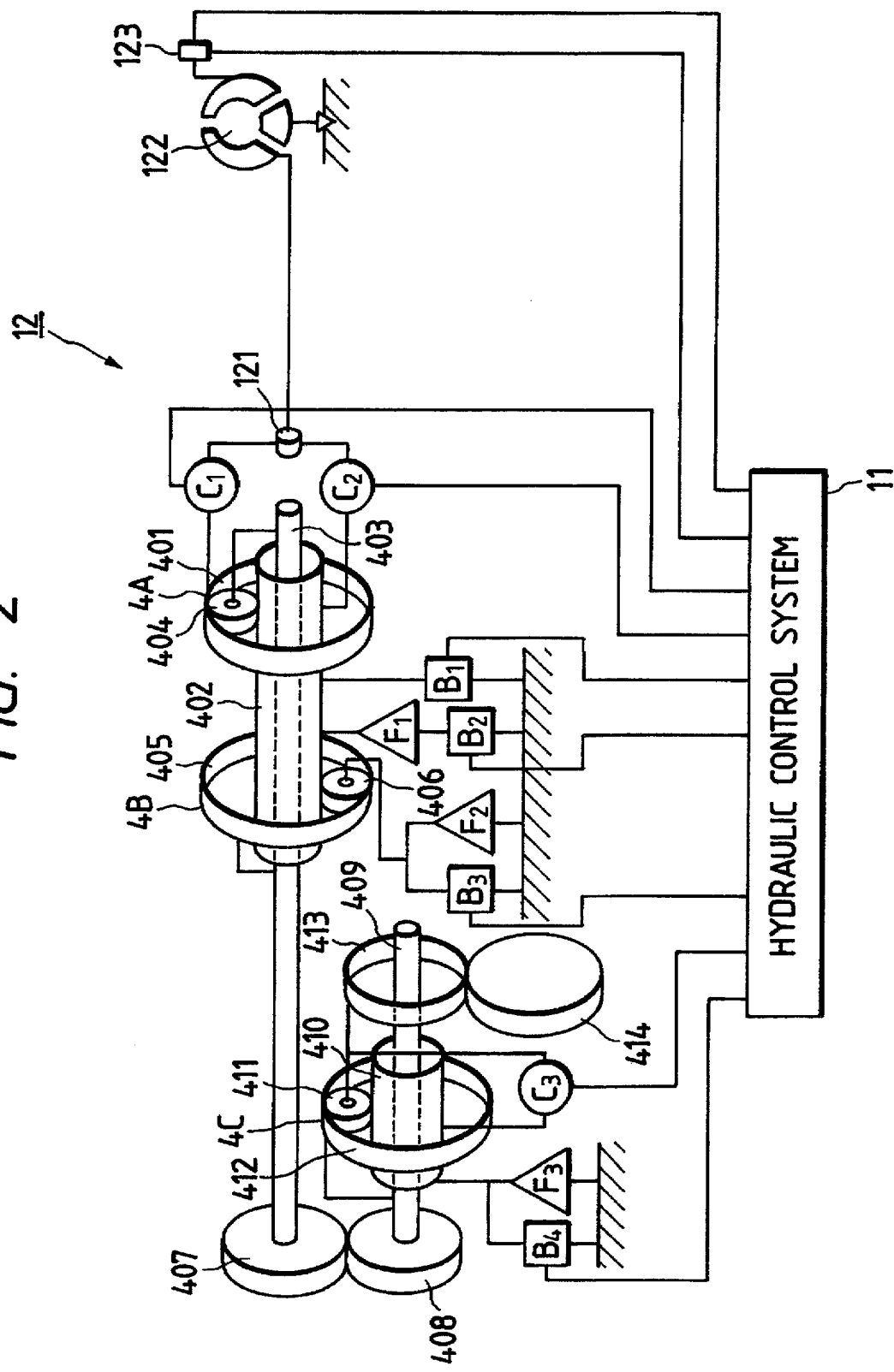
FIG. 2 is a schematic view showing an arrangement of a gear train in the automatic transmission shown in FIG. 1.

FIG. 2 shows details of the power train 12. In the drawing, an input shaft 121 of the gear train 12 is connected to an output shaft of a torque converter 122. The input shaft 121 is connected to a ring gear 401 of a front planetary gear train 4A through a clutch C1 and to a sun gear 402 of the front planetary gear train 4A through a clutch C2, respectively. The sun bear 402, commonly engaged with the front planetary gear train 4A and a rear planetary gear train 4B, is directly connected to a brake B1 and also indirectly connected to a brake B2 through a one-way clutch F1.

An intermediate shaft 403 connects a pinion 404 of the front planetary gear train 4A, a ring gear 405 of a rear planetary gear train 4B and a counter drive gear 407. A pinion 406 of the rear planetary gear train 4B is connected to a one-way clutch F2 and a brake B3 disposed in parallel with each other. The counter drive gear 407 is meshed with a counter driven gear 408.

A counter shaft 409 extending from the counter driven gear 408 is connected to a ring gear 412 of a counter planetary gear train 4C. A sun gear 410 of the counter planetary gear train 4C is connected to a one-way clutch F3 and a brake B4 disposed in parallel with each other. A clutch C3 is interposed between the sun gear 410 and a pinion gear 411 of the counter planetary gear train 4C. The pinion gear 411 is connected to a differential drive pinion 413 which is meshed with a ring gear 414. An output shaft (not shown) is connected to the ring gear 414. The above-described torque converter 122 is provided with a lock-up clutch 123. The input and output shafts of the torque converter 122 are fixedly engaged or disengaged by selectively supplying hydraulic pressure to front and rear sides of the lock-up clutch 123.

The above-described clutches C1 through C3 and brakes B1 through B4 cooperatively realize a plurality of shift positions in accordance with a shift range of a shift lever. Table 1 of FIG. 4 shows an operative relationship between respective shift positions of the shift lever shiftable across P, R, N, D, H and L ranges and corresponding operative conditions of clutches C1–C3 and brakes B1–B4, wherein a circular mark "o" represents an engagement of each friction device by fluid pressure supply.

Selective supply of hydraulic pressure to respective friction devices, specified by the table 1, is performed by the hydraulic control system 11. As apparent from table 1, the automatic transmission in accordance with the present invention realizes a total of six, 1st through O/D, speeds in the "D" range; a total of three, 1st, 3rd and 5th, speeds in the "H" range; and two, 1st and 3rd, speeds in the "L" range.

Figure 3:
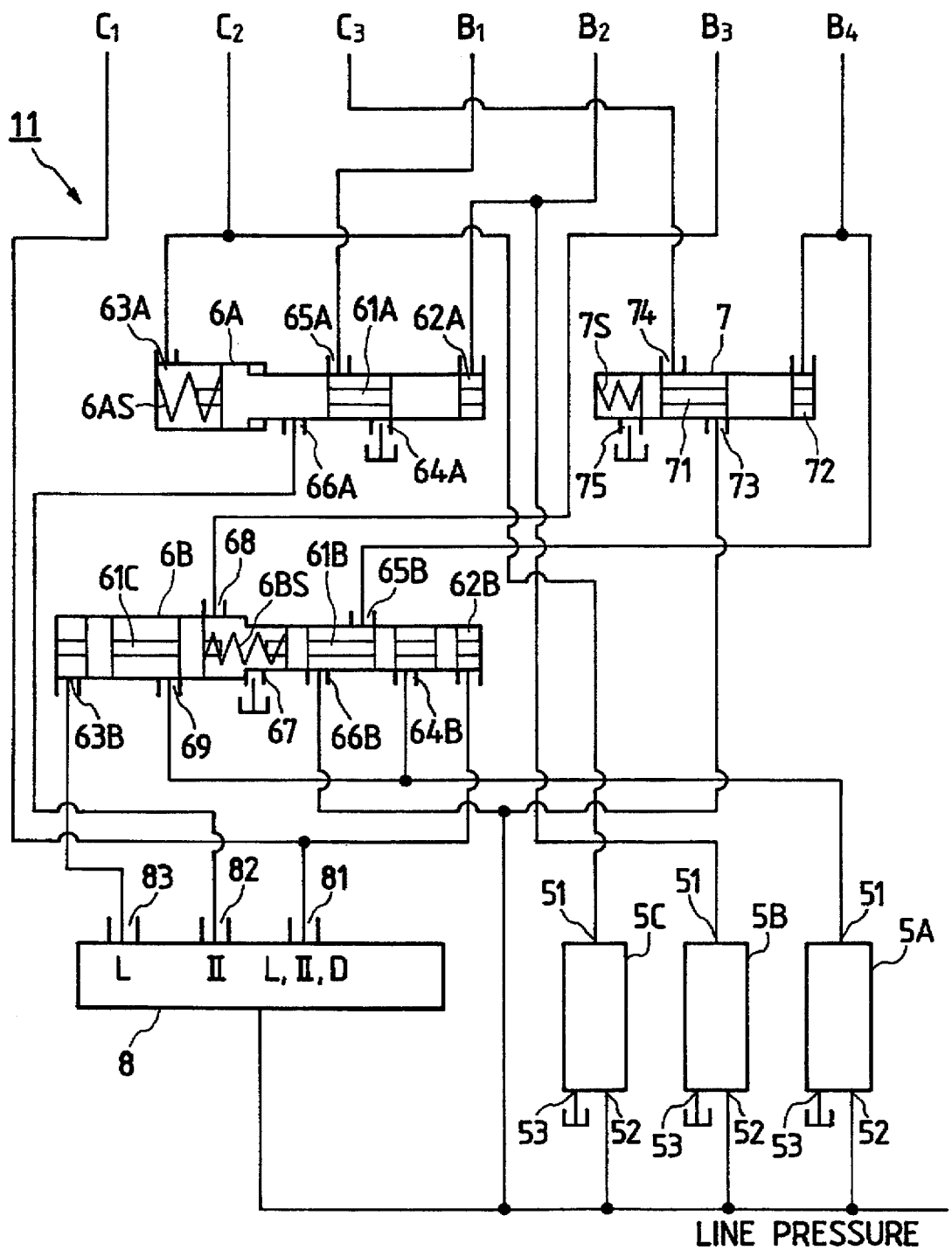
FIG. 3 is a hydraulic circuit diagram showing a hydraulic control system for selectively connecting or fixing friction devices in the automatic transmission shown in FIG. 1.

FIG. 3 is a circuit diagram showing the details of the hydraulic control system 11. The hydraulic control system 11 comprises a manual shift valve 8 shiftable in accordance with a shift movement of a shift lever (not shown) operated by a driver, three electromagnetic valves 5A through 5C, and three mechanical shift valves 6A, 6B and 7. Each of electromagnetic valves 5A through 5C has an ON position where an output port 51 is connected to a line port 52 and an OFF position where the output port 51 is connected to a drain port 53. Switching between ON position and OFF position is performed by duty control so as not to cause any shift shock.

In FIG. 3, the manual shift valve 8 has three output ports 81, 82 and 83 controlling supply and release of line pressure which is supplied from an oil pump (not shown) equipped in the power train 12. The first output port 81 always supplying line pressure to the hydraulic circuit (or hydraulic piping) in the hydraulic control system 11 throughout "L", "H" and "D" ranges. Meanwhile, the second output port 82 supplies line pressure during "H" range only and releases the same in both of "D" and "L" ranges. On the other hand, the third output port 83 supplies line pressure during "L" range and releases the same in both of "H" and "D" ranges.

Each of the mechanical shift valves 6A and 6B has pressure chambers at right and left ends thereof so as to cause a shift movement of spool(s) slidably accommodated therein. More specifically, first shift valve 6A has a right pressure chamber 62A and a left pressure chamber 63A defined by both ends thereof and one spool 61A slidably accommodated therein. Second shift valve 6B has a right pressure chamber 62B and a left pressure chamber 6SB defined by both ends thereof and two spools 61B and 61C slidably and serially disposed therein.

In the first shift valve 6A, the cross-sectional area of right pressure chamber 62A is smaller than that of left pressure chamber 63A. Similarly, in the second shift valve 6B, the cross-sectional area of right pressure chamber 62B is smaller than that of left pressure chamber 63B.

Spool 61A in the first shift valve 6A is always urged by a spring 6AS disposed in the left pressure chamber 63A; thus, spool 61A is positioned at a right home position unless any pressing force is applied thereon from the right pressure chamber 62A.

Two spools 61B and 61C in the second shift valve 6B are connected with each other by means of a resiliently deformable spring 6BS. When hydraulic pressure is applied to the right pressure chambers 62A and 62B of respective shift valves 6A and 6B, the spools 61A and 61B move left against resilient forces of springs 6AS and 6BS, although the spool 61C is stationarily positioned at the left home position (outermost end).

Meanwhile, when hydraulic pressure is applied to the left pressure chambers 63A and 63B of respective shift valves 6A and 6B under the presence of hydraulic pressure applied to respective right pressure chambers 62A and 62B, all of spools 61A, 61B and 61C move right simply because the hydraulic pressures acting from the left pressure chambers 63A and 63B on the spools 61A and 61C are larger than the corresponding hydraulic pressures acting on the spools 61A and 61B from the right pressure chambers 62A and 62B due to the difference of cross-sectional areas thereof. Through such shift controls of spools 61A, 61B and 61C in respective shift valves 6A and 6B, fluid communication path is switched between input ports and output ports thereof.

Third shift valve 7 has only one pressure chamber 72 defined between a spool 71 slidably accommodated therein and the right end thereof. When hydraulic pressure is applied to the pressure chamber 72, the spool 71 moves left against a resiliently deformable spring 7S, thereby switching fluid communication path between input ports and output ports thereof.

More specifically, first shift valve 6A has one input port 66A connected to the output port 82 of the manual shift valve 8, one output port 65A connected to the brake B1, and one drain port 64A. The right pressure chamber 62A of the first shift valve 6A is connected to the brake B2 and the output port 51 of electromagnetic valve 5B. On the other hand, the left pressure chamber 63A is connected to the clutch C2 and the output port 51 of electromagnetic valve 5C.

Meanwhile, the second shift valve 6B has three input ports 64B, 66B and 69, two output ports 65B and 68, and one drain port 67. Of these ports, two input ports 64B and 69 are connected to output port 51 of electromagnetic valve 5A, while other input port 66B is always supplied with line pressure. Output port 65B is connected to the brake B4, and the other output port 68 is connected to the brake B3.

Furthermore, the right pressure chamber 62B of the second shift valve 6B is connected to output port 81 of the manual shift valve 8. The clutch C1 is also connected to the output port 81 of the manual shift valve 8. On the other hand, the left pressure chamber 63B of the second shift valve 6B is connected to output port 83 of the manual shift valve 8.

Moreover, third shift valve 7 has one input port 73 which is always supplied with line pressure, one output port 74 connected to the clutch C3, and one drain port 75. The pressure chamber 72 of the third shift valve 7 is connected to the brake B4 and output port 65B of the second shift valve 6B.

1st speed (D-1) mode in "D" range

Figure 5:
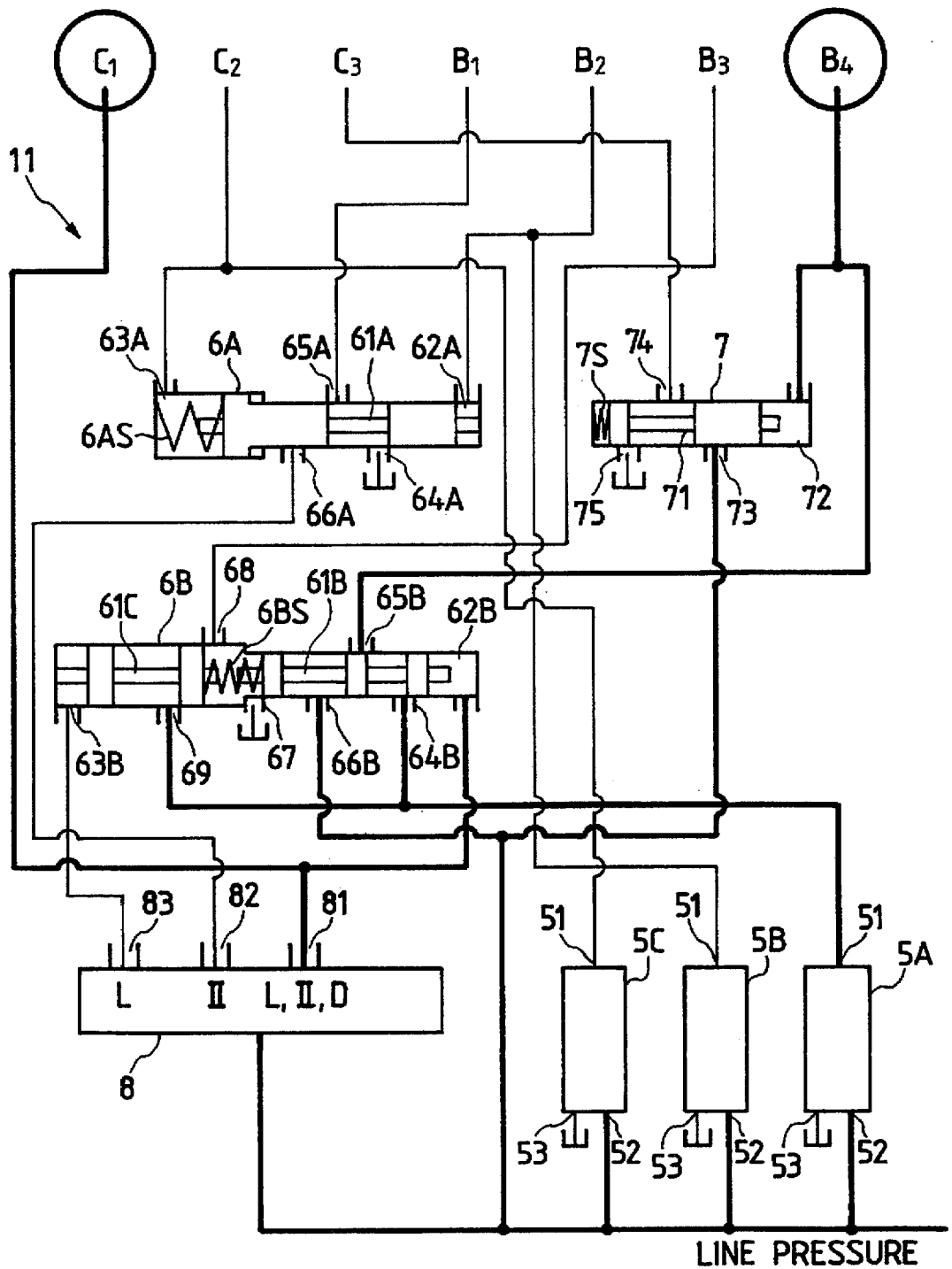
FIG. 5 is a hydraulic circuit diagram showing the delivery of hydraulic pressure to respective friction devices in a 1st (D-1) mode of "D" range in the hydraulic control system shown in FIG. 3.

Referring now to FIG. 5, an establishment of a 1st speed (i.e. D-1) mode of the D range will be explained. When the shift lever is positioned in the "D" range, line pressure is delivered directly to the clutch C1 from the output port 81 of the manual shift valve 8. Meanwhile, line pressure is also directly applied to the right pressure chamber 62B of the second shift valve 6B. Thus, the spool 61B is moved left against the resilient force of the spring 6BS so that a fluid communication path is established between input port 64B and output port 65B.

Under this condition, electromagnetic valve 5A is activated (i.e. turned on) to supply line pressure to the brake B4 via the input and output ports 64B and 65B of the second shift valve 6B. In this case, line pressure is applied to the pressure chamber 72 of the third shift valve 7, as well as the brake B4. Hence, the spool 71 is moved left against the resilient force of the spring 7S so that output port 74 is communicated with drain port 75 to release any hydraulic pressure acting on the clutch C3.

As other electromagnetic valves 5B and 5C are deactivated (i.e. turned off) at this moment, no hydraulic pressure is applied to the brake B2 and clutch C2. Furthermore, a fluid communication path established between drain port 64A and output port 65A in the first shift valve 6A allows any pressurized oil to drain away from the brake B1. Similarly, a fluid communication path established between drain port 67 and output port 68 in the second shift valve 6B allows any pressurized oil to drain away from the brake B3.

Table 2 shown in FIG. 18 shows an operative relationship between respective shift positions of the D, H and L ranges and corresponding operative conditions of electromagnetic valves 5A, 5B and 5C. As explained above, the 1st speed mode of the D range is established when electromagnetic valve 5A is turned on while other electromagnetic valves 5B and 5C are turned off.

2nd speed (D-2) mode in "D" range

Figure 6:
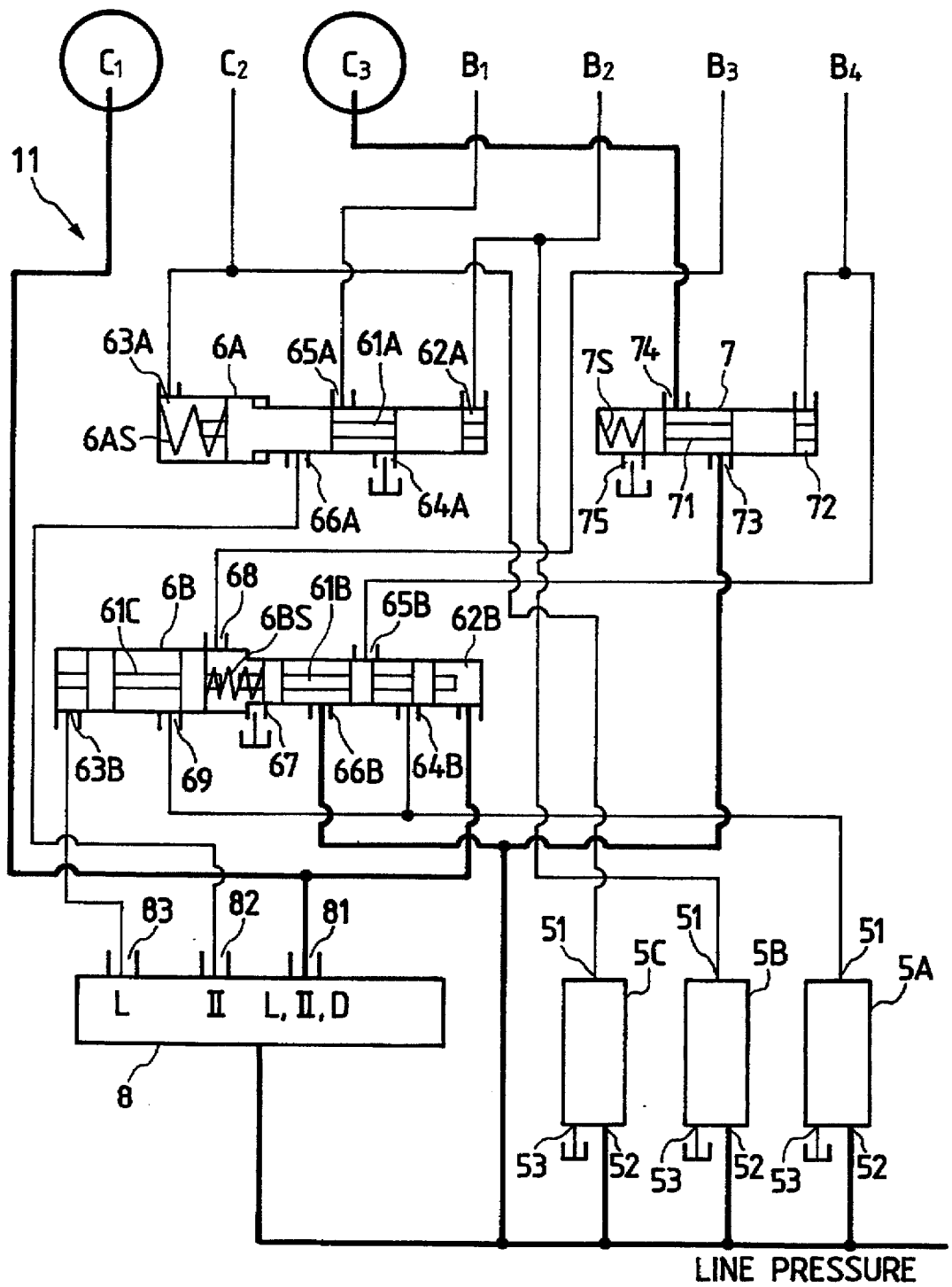
FIG. 6 is a hydraulic circuit diagram showing the delivery of hydraulic pressure to respective friction devices in a 2nd (D-2) mode of "D" range in the hydraulic control system shown in FIG. 3.

Referring now to FIG. 6, an establishment of a 2nd speed (i.e. D-2) mode of the D range will be explained. As the shift lever is still positioned in the "D" range, line pressure is continuously delivered directly to the clutch C1 from the output port 81 of the manual shift valve 8. Meanwhile, line pressure is still directly applied to the right pressure chamber 62B of the second shift valve 6B. Thus, the spool 61B maintains the same (left) position against the resilient force of the spring 6BS so that the fluid communication path is continuously established between input port 84B and output port 85B.

However, under this condition, electromagnetic valve 5A is deactivated (i.e. turned off) to release pressurized oil from the brake B4 via the input and output ports 64B and of the second shift valve 8B to the drain port 53 of the electromagnetic valve 5A. At the same time, the line pressure applied to the pressure chamber 72 of the third shift valve is also released passing through the same drain path. Hence, the spool 71 is shifted by the resilient force of the spring 7S and returned to the right position so that a fluid communication path is established between input port 73 and output port 74. Upon communication between these two ports 73 and 74, line pressure is applied to the clutch C3, thereby engaging the clutch CS.

As other electromagnetic valves 5B and 5C are still deactivated (i.e. turned off), no hydraulic pressure is applied to the brake B2 and clutch C2. Furthermore, the fluid communication path established between drain port 64A and output port 65A in the first shift valve 6A allows any pressurized oil to drain away from the brake B1. Similarly, the fluid communication path established between drain port and output port 68 in the second shift valve 6B allows any pressurized oil to drain away from the brake B3.

With the above arrangement, the 2nd speed of the "D" range is realized. In other words, the 2nd speed mode of the D range is established when all of electromagnetic valves 5A, 5B and 5C are turned off, as shown in FIG. 16.

3rd speed (D-3) mode in "D" range

Figure 7:
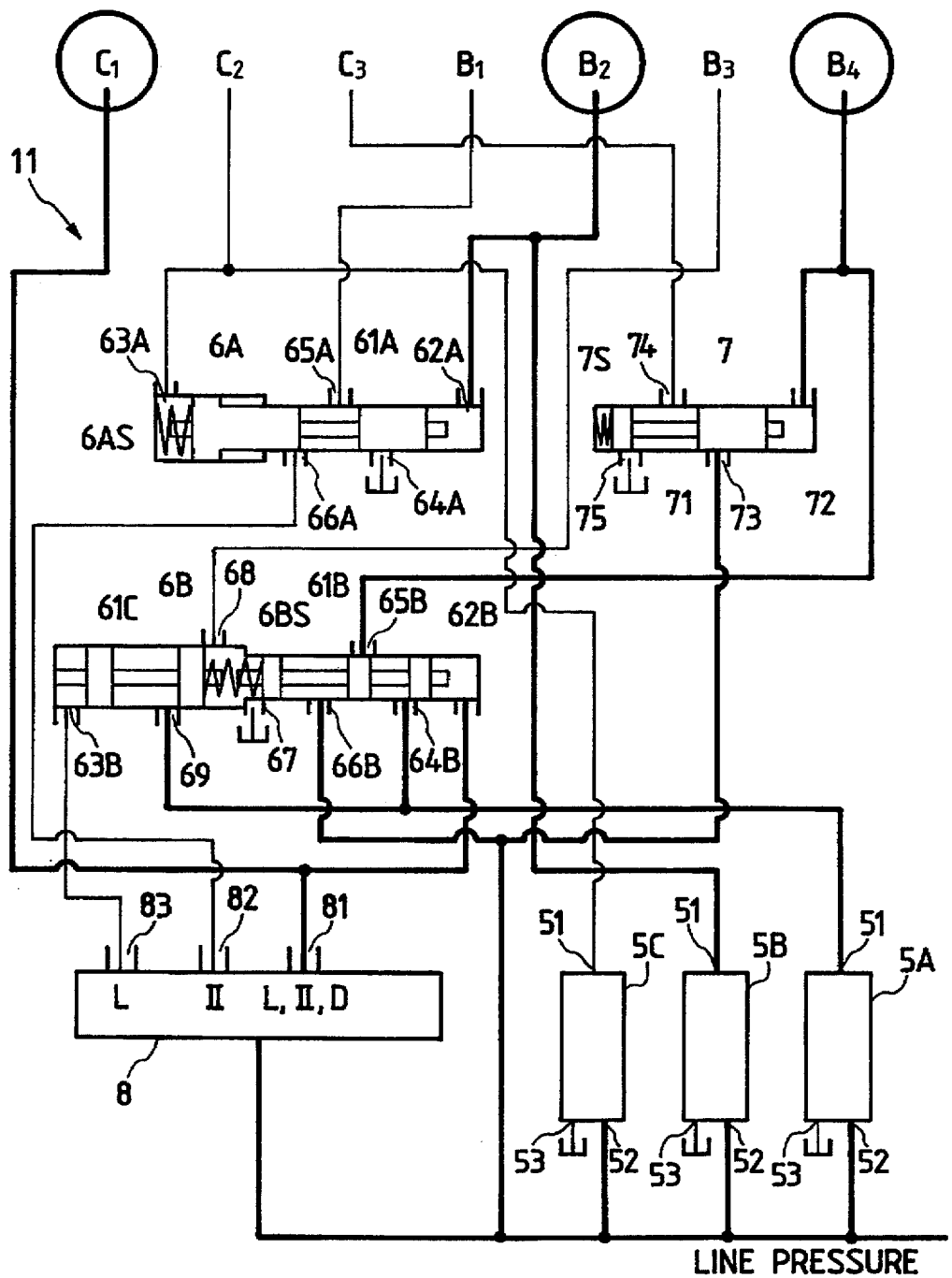
FIG. 7 is a hydraulic circuit diagram showing the delivery of hydraulic pressure to respective friction devices in a 3rd (D-3) mode of "D" range in the hydraulic control system shown in FIG. 3.

Referring now to FIG. 7, an establishment of a 3rd speed (i.e. D-3) mode of the D range will be explained. As long as the shift lever is positioned in the same "D" range, line pressure is continuously delivered directly to the clutch C1 from the output port 81 of the manual shift valve 8. Meanwhile, line pressure is also directly applied to the right pressure chamber 62B of the second shift valve 6B. Thus, the spool 61B maintains the same (left) position against the resilient force of the spring 6BS so that the fluid communication path is continuously established between input port 64B and output port 65B.

Under this condition, electromagnetic valve 5A is activated (i.e. turned on) to supply pressurized oil (i.e. line pressure) to the brake B4 via the input and output ports 64B and 65B of the second shift valve 6B. At the same time, the line pressure is applied to the pressure chamber 72 of the third shift valve 7 so as to move the spool 71 left against the resilient force of the spring 7S so that output port 74 is communicated with drain port 75 to release any hydraulic pressure acting on the clutch C3, thereby disengaging the clutch C3.

Furthermore, another electromagnetic valve 5B is activated (i.e. turned on) to supply pressurized oil (i.e. line pressure) to the brake B2 directly. The line pressure is also applied to the right pressure chamber 62A of the first shift valve 6A so as to shift the spool 61A leftward against the resilient force of the spring 6AS so that output port 65A is communicated with input port 66A. However, the output port 82 of the manual shift valve 8 is released; therefore, any pressurized oil is drained from the brake B1 via the output and input ports 65A and 66A of the first shift valve 6.

The remaining electromagnetic valve 5C is still deactivated (i.e. turned off), therefore no hydraulic pressure is applied to the clutch C2. Furthermore, the fluid communication path established between drain port 67 and output port 68 in the second shift valve 6B allows any pressurized oil to drain away from the brake B3.

With the above arrangement, the 3rd speed of the "D" range is realized. In other words, the 3rd speed mode of the D range is established when two electromagnetic valves 5A and 5B are turned on while the remaining electromagnetic valve 5C is turned off, as shown in FIG. 16.

4th speed (D-4) mode in "D" range

Figure 8:
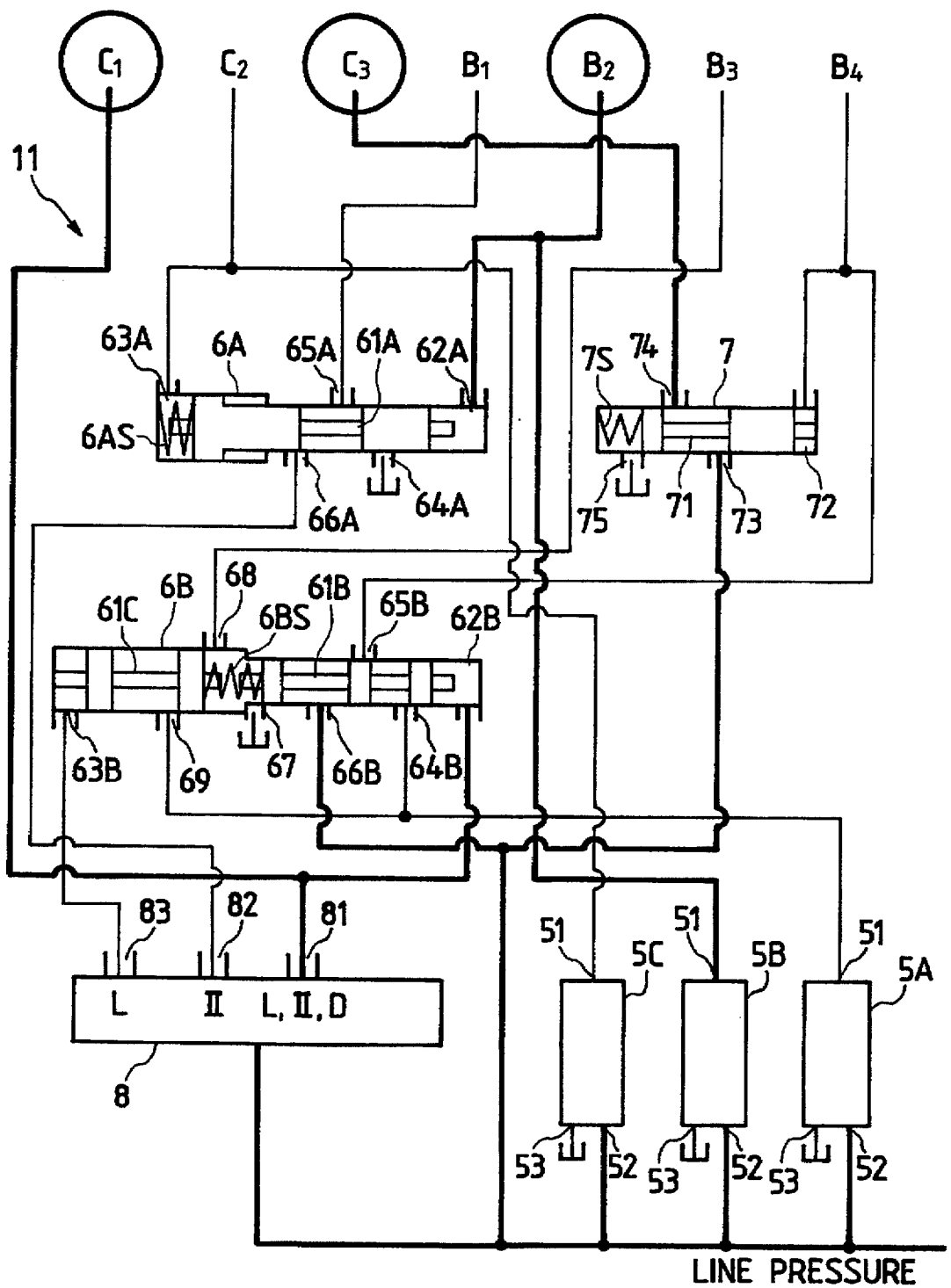
FIG. 8 is a hydraulic circuit diagram showing the delivery of hydraulic pressure to respective friction devices in a 4th (D-4) mode of "D" range in the hydraulic control system shown in FIG. 3.

Referring now to FIG. 8, an establishment of a 4th speed (i.e. D-4) mode of the D range will be explained. Since the shift lever is still positioned in the same "D" range, line pressure is continuously delivered directly to the clutch C1 from the output port 81 of the manual shift valve 8. Meanwhile, line pressure is also directly applied to the right pressure chamber 62B of the second shift valve 6B. Thus, the spool 61B maintains the same (left) position against the resilient force of the spring 6BS so that the fluid communication path is continuously established between input port 64B and output port 65B.

Under this condition, electromagnetic valve 5A is deactivated (i.e. turned off) to release pressurized oil from the brake B4 via the input and output ports 64B and 65B of the second shift valve 6B to the drain port 53 of the electromagnetic valve 5A. At the same time, the line pressure applied to the pressure chamber 72 of the third shift valve 7 is also released passing through the same drain path. Hence, the spool 71 is shifted by the resilient force of the spring 7S and returned the right position so that a fluid communication path is established between input port 73 and output port 74. Upon communication between these two ports 73 and 74, line pressure is applied to the clutch C3, thereby engaging the clutch C3.

Furthermore, another electromagnetic valve 5B is still activated (i.e. turned on) to supply pressurized oil (i.e. line pressure) to the brake B2 directly. The line pressure is also applied to the right pressure chamber 62A of the first shift valve 6A so as to shift the spool 61A leftward against the resilient force of the spring 6AS so that output port 65A is communicated with input port 66A. However, the output port 82 of the manual shift valve 8 is released; therefore, any pressurized oil is drained from the brake B1 via the output and input ports 65A and 68A of the first shift valve 6.

The remaining electromagnetic valve 5C is still deactivated (i.e. turned off), therefore no hydraulic pressure is applied to the clutch C2. Furthermore, the fluid communication path established between drain port 67 and output port 68 in the second shift valve 6B allows any pressurized oil to drain away from the brake B3.

With the above arrangement, the 4th speed of the "D" range is realized. In other words, the 4th speed mode of the D range is established when one electromagnetic valve 5B is turned on while the remaining two electromagnetic valves 5A and 5C are turned off, as shown in FIG. 16.

5th speed (D-5) mode in "D" range

Figure 9:
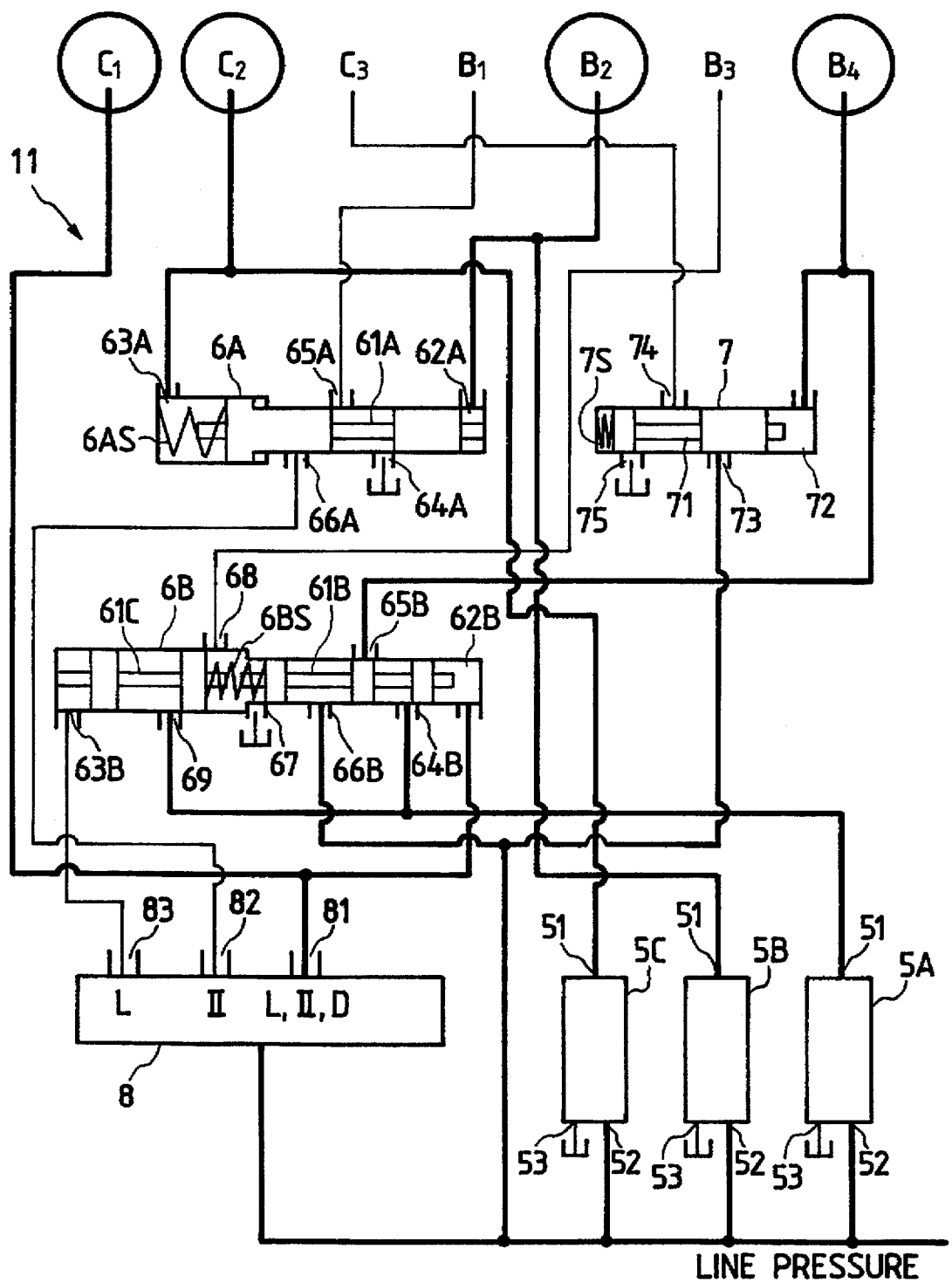
FIG. 9 is a hydraulic circuit diagram showing the delivery of hydraulic pressure to respective friction devices in a 5th (D-5) mode of "D" range in the hydraulic control system shown in FIG. 3.

Referring now to FIG. 9, an establishment of a 5th speed (i.e. D-5) mode of the D range will be explained. As long as the shift lever is positioned in the same "D" range, line pressure is continuously delivered directly to the clutch C1 from the output port 81 of the manual shift valve 8. Meanwhile, line pressure is also directly applied to the right pressure chamber 62B of the second shift valve 6B. Thus, the spool 61B maintains the same (left) position against the resilient force of the spring 6BS so that the fluid communication path is continuously established between input port 64B and output port 65B.

Under this condition, electromagnetic valve 5A is activated (i.e. turned on) to supply pressurized oil (i.e. line pressure) to the brake B4 via the input and output ports 64B and 65B of the second shift valve 6B. At the same time, the line pressure is applied to the pressure chamber 72 of the third shift valve 7 so as to move the spool 71 left against the resilient force of the spring 7S so that output port 74 is communicated with drain port 75 to release any hydraulic pressure acting on the clutch C3, thereby disengaging the clutch C3.

Furthermore, another electromagnetic valve 5B is activated (i.e. turned on) to supply pressurized oil (i.e. line pressure) to the brake B2 directly. The line pressure is also applied to the right pressure chamber 62A of the first shift valve 6A.

The remaining electromagnetic valve 5C is activated (i.e. turned on) for the first time, therefore pressurized oil is directly supplied to the clutch C2. The pressurized oil is also delivered to the left pressure chamber 63A of the first shift valve 6A. Thus, hydraulic pressure acts on the spool 61A from both pressure chambers 62a and 63A.

In such a case, the pressing force acting from the left pressure chamber 63A overcomes the other pressing force acting from the right pressure chamber 62A due to difference of cross-sectional areas of both chambers 62A and 63A.

$$P_L \cdot S_{al} > P_L \cdot S_{ar}$$

where $P_L$ represents line pressure, $S_{al}$ represents a cross-sectional area of the left pressure chamber 63A and $S_{ar}$ represents a cross-sectional area of the right pressure chamber 62A.

Thus, the spool 61A moves right in the first shift valve 6A so that a fluid communication path is established between output port 65A and drain port 64A in the first shift valve 6A, thereby draining pressurized oil away from the brake B1.

Furthermore, the fluid communication path established between drain port 67 and output port 68 in the second shift valve 6B allows any pressurized oil to drain away from the brake B3.

With the above arrangement, the 5th speed of the "D" range is realized. In other words, the 5th speed mode of the D range is established when all of electromagnetic valves 5A, 5B and 5C are turned on, as shown in FIG. 16.

Overdrive speed (O/D) mode in "D" range

Figure 10:
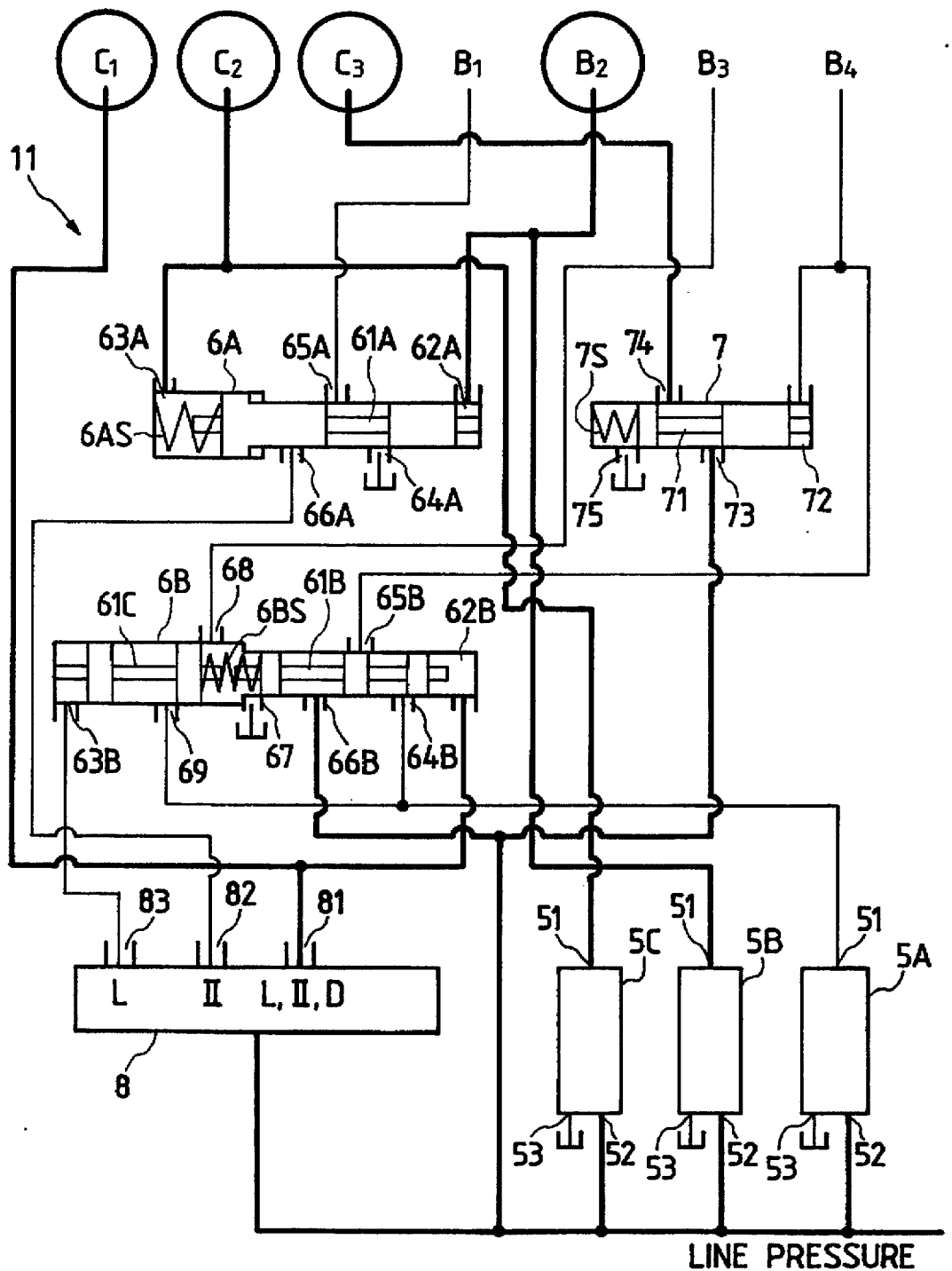
FIG. 10 is a hydraulic circuit diagram showing the delivery of hydraulic pressure to respective friction devices in an overdrive mode of "D" range in the hydraulic control system shown in FIG. 3.

Referring now to FIG. 10, an establishment of an overdrive speed (i.e. O/D) mode of the D range will be explained. The shift lever is still positioned in the "D" range, line pressure is continuously delivered directly to the clutch C1 from the output port 81 of the manual shift valve 8. Meanwhile, line pressure is also directly applied to the right pressure chamber 62B of the second shift valve 6B. Thus, the spool 61B maintains the same (left) position against the resilient force of the spring 6BS so that the fluid communication path is continuously established between input port 64B and output port 85B.

However, under this condition, electromagnetic valve 5A is deactivated (i.e. turned off) to release pressurized oil from the brake B4 via the input and output ports 64B and 65B of the second shift valve 6B to the drain port 52 of the electromagnetic valve 5A. The line pressure applied to the pressure chamber 72 of the third shift valve 7 is released passing through the same drain path. Hence, the spool 71 is shifted by the resilient force of the spring 7S and returned to the right position so that a fluid communication path is established between input port 73 and output port 74. Upon communication between these two ports 73 and 74, line pressure is applied to the clutch C3, thereby engaging the clutch C3.

Furthermore, another electromagnetic valve 5B is still activated (i.e. turned on) to supply pressurized oil (i.e. line pressure) to the brake B2 directly. The line pressure is also applied to the right pressure chamber 62A of the first shift valve 6A.

The remaining electromagnetic valve 5C is also still activated (i.e. turned on), therefore pressurized oil (i.e. line pressure) is directly applied to the clutch C2. The pressurized oil is also delivered to the left pressure chamber 63A of the first shift valve 8A. In the same manner as the above-described 5th speed mode, in such a case, the pressing force acting from the left pressure chamber 63A on the spool 61A overcomes the other pressing force acting from the right pressure chamber 62A due to difference of cross-sectional areas of both chambers 62A and 63A.

Hence, the spool 61A maintains the same (right) position in the first shift valve 6A so that the fluid communication path is continuously established between output port 65A and drain port 64A, thereby draining pressurized oil away from the brake B1.

Furthermore, the fluid communication path established between drain port 67 and output port 68 in the second shift valve 6B allows any pressurized oil to drain away from the brake B3.

With the above arrangement, the overdrive speed of the "D" range is realized. In other words, the overdrive speed mode of the D range is established when one electromagnetic valve 5A is turned off while electromagnetic valves 5B and 5C are turned on, as shown in FIG. 16.

In this manner, the present invention realizes a total of six, i.e. 1st through O/D, speeds in the "D" range using only three electromagnetic valves 3A–3C and three mechanical shift valves 6A, 6B and 7.

1st speed (H-1) mode in "H" range

Figure 11:
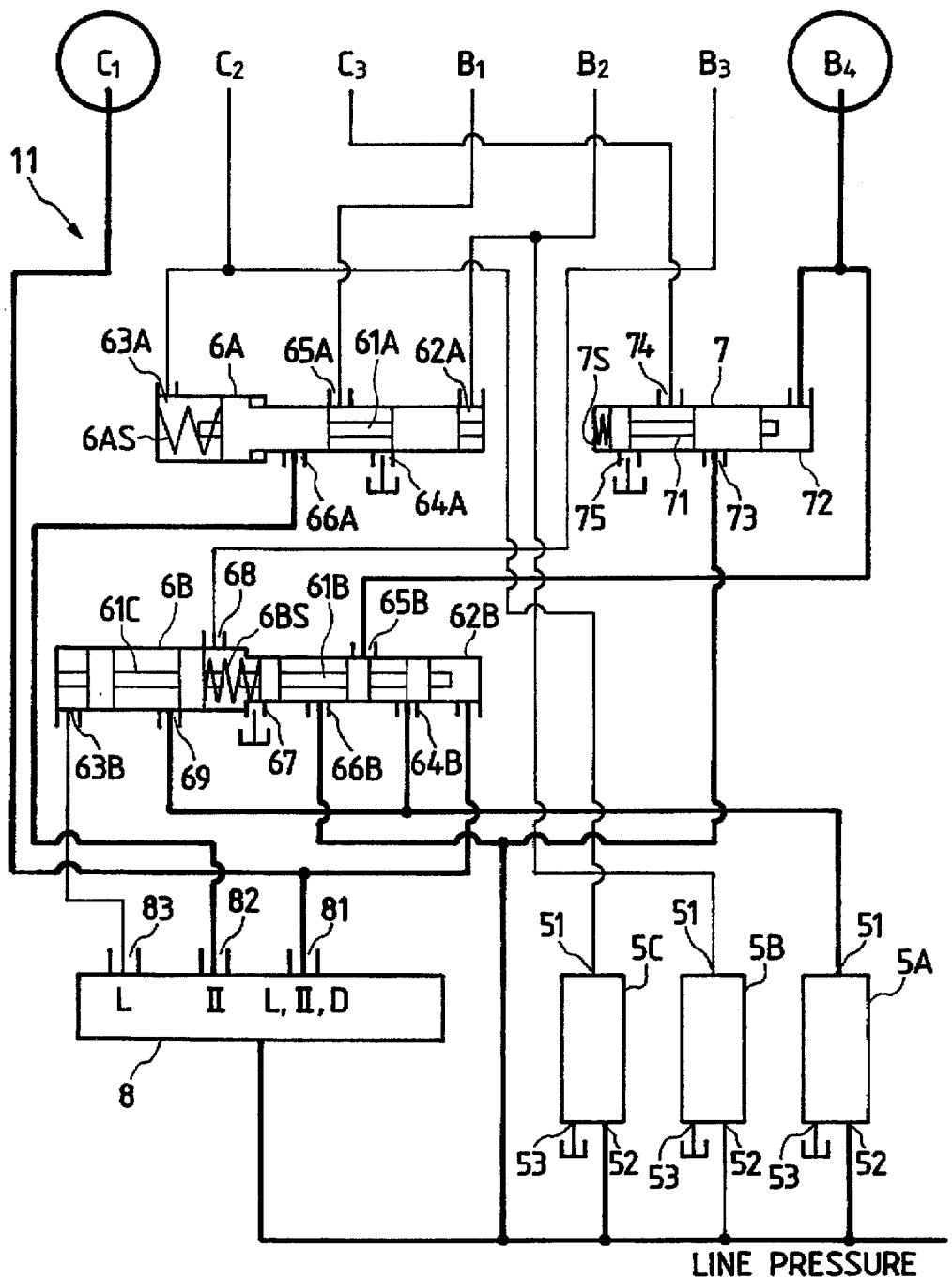
FIG. 11 is a hydraulic circuit diagram showing the delivery of hydraulic pressure to respective friction devices in a 1st (H-1) mode of "H" range in the hydraulic control system shown in FIG. 3.

Referring now to FIG. 11, an establishment of a 1st speed (i.e. H-1) mode of the H range will be explained. When the shift lever is positioned in the "H" range, line pressure is delivered from output port 82 as well as output port 81. More specifically, the line pressure is directly delivered to the clutch C1 from the output port 81 of the manual shift valve 8. Meanwhile, line pressure is directly applied to the right pressure chamber 62B of the second shift valve 6B. Thus, the spool 61B is moved left against the resilient force of the spring 6BS so that a fluid communication path is established between input port 64B and output port 65B.

Under this condition, electromagnetic valve 5A is activated (i.e. turned on) to supply line pressure to the brake B4 via the input and output ports 64B and 65B of the second shift valve 6B. In this case, line pressure is applied to the pressure chamber 72 of the third shift valve 7, too. Hence, the spool 71 is moved left against the resilient force of the spring 7S so that output port 74 is communicated with drain port 75 to release any hydraulic pressure acting on the clutch C3. As other electromagnetic valves 5B and 5C are deactivated (i.e. turned off) at this moment, no hydraulic pressure is applied to the brake B2 and clutch C2.

Furthermore, a fluid communication path established between drain port 64A and output port 65A in the first shift valve 6A allows any pressurized oil to drain away from the brake B1. Similarly, a fluid communication path established between drain port 67 and output port 68 in the second shift valve 6B allows any pressurized oil to drain away from the brake B3.

With the above arrangement, the 1st speed of the "D" range is realized. In other words, the 1st speed mode of the H range is established when one electromagnetic valve 5A is turned on while other electromagnetic valves 5B and 5C are turned off, as shown in FIG. 16.

Figure 12:
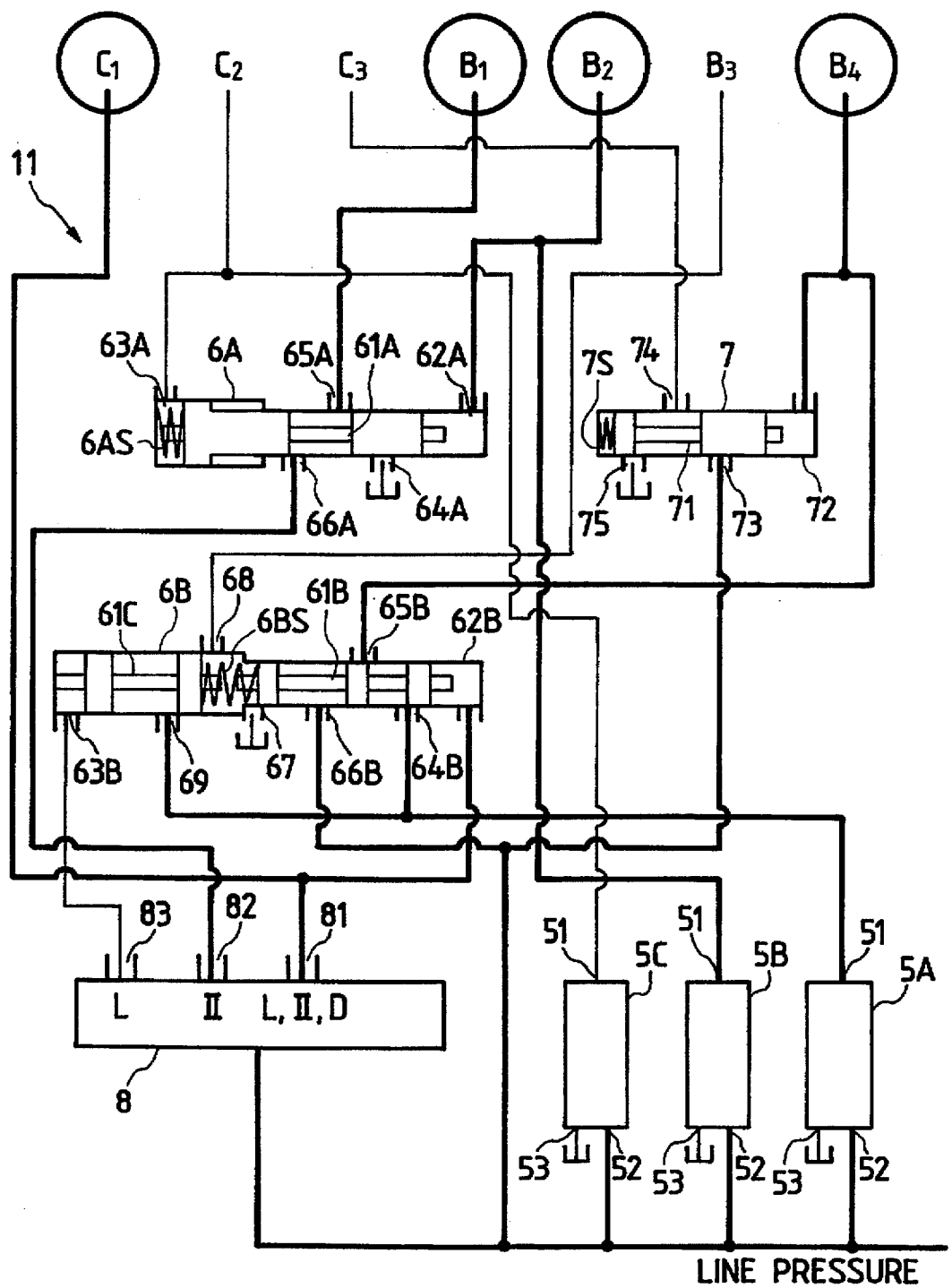
FIG. 12 is a hydraulic circuit diagram showing the delivery of hydraulic pressure to respective friction devices in a 3rd (H-3) mode of "H" range in the hydraulic control system shown in FIG. 3.

3rd speed (H-3) mode in "H" range Referring now to FIG. 12, an establishment of a 3rd speed (i.e. H-3) mode of the H range will be explained. As long as the shift lever is positioned in the "H" range, line pressure is continuously delivered directly to the clutch C1 from the output port 81 of the manual shift valve 8. Meanwhile, line pressure is also directly applied to the right pressure chamber 62B of the second shift valve 6B. Thus, the spool 61B maintains the same (left) position against the resilient force of the spring 6BS so that the fluid communication path is continuously established between input port 64B and output port 65B.

Under this condition, electromagnetic valve 5A is still activated (i.e. turned on) to supply pressurized oil (i.e. line pressure) to the brake B4 via the input and output ports 64B and 65B of the second shift valve 6B. At the same time, the line pressure is applied to the pressure chamber 72 of the third shift valve 7 so as to move the spool 71 left against the resilient force of the spring 7S so that output port 74 is communicated with drain port 75 to release any hydraulic pressure acting on the clutch C3, thereby disengaging the clutch C3.

Furthermore, another electromagnetic valve 5B is activated (i.e. turned on) to supply pressurized oil (i.e. line pressure) to the brake B2 directly. The line pressure is also applied to the right pressure chamber 62A of the first shift valve 6A so as to shift the spool 61A leftward against the resilient force of the spring 6AS so that output port 65A is communicated with input port 66A. Hence, pressurized oil (i.e. line pressure) is supplied to the brake B1 via the output and input ports 65A and 66A of the first shift valve 6.

The remaining electromagnetic valve 5C is still deactivated (i.e. turned off), therefore no hydraulic pressure is applied to the clutch C2. Furthermore, the fluid communication path established between drain port 67 and output port 68 in the second shift valve 6B allows any pressurized oil to drain away from the brake B3.

With the above arrangement, the 3rd speed of the "H" range is realized. In other words, the 3rd speed mode of the H range is established when two electromagnetic valves 5A and 5B are turned on while the remaining electromagnetic valve 5C is turned off, as shown in FIG. 16.

5th speed (H-5) mode in "H" range

Figure 13:
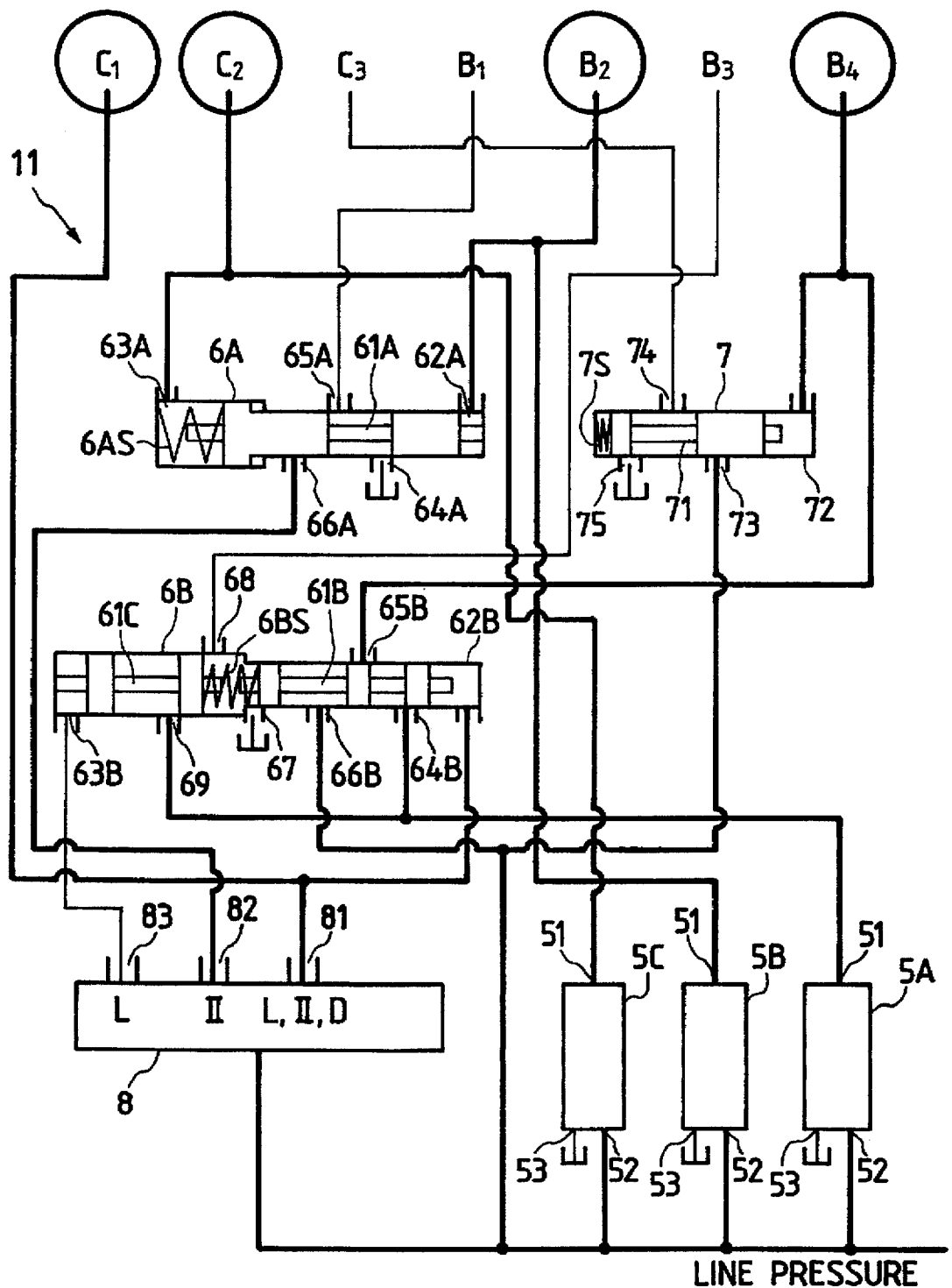
FIG. 13 is a hydraulic circuit diagram showing the delivery of hydraulic pressure to respective friction devices in a 5th (H-5) mode of "H" range in the hydraulic control system shown in FIG. 3.

Referring now to FIG. 13, an establishment of a 5th speed (i.e. H-5) mode of the H range will be explained. As long as the shift lever is positioned in the same "H" range, line pressure is continuously delivered directly to the clutch C1 from the output port 81 of the manual shift valve 8. Meanwhile, line pressure is also directly applied to the right pressure chamber 62B of the second shift valve 6B. Thus, the spool 61B maintains the same (left) position against the resilient force of the spring 6BS so that the fluid communication path is continuously established between input port 64B and output port 65B.

Under this condition, electromagnetic valve 5A is activated (i.e. turned on) to supply pressurized oil (i.e. line pressure) to the brake B4 via the input and output ports 64B and 65B of the second shift valve 6B. At the same time, the line pressure is applied to the pressure chamber 72 of the third shift valve 7 so as to move the spool 71 left against the resilient force of the spring 7S so that output port 74 is communicated with drain port 75 to release any hydraulic pressure acting on the clutch C3, thereby disengaging the clutch C3.

Furthermore, another electromagnetic valve 5B is activated (i.e. turned on) to supply pressurized oil (i.e. line pressure) to the brake B2 directly. The line pressure is also applied to the right pressure chamber 62A of the first shift valve 6A.

The remaining electromagnetic valve 5C is activated (i.e. turned on), therefore pressurized oil is directly supplied to the clutch C2. The pressurized oil is also delivered to the left pressure chamber 63A of the first shift valve 6A. Thus, hydraulic pressure acts on the spool 61A from both pressure chambers 62a and 63A. In such a case, the pressing force acting from the left pressure chamber 63A on the spool 61A overcomes the other pressing force acting from the right pressure chamber 62A due to difference of cross-sectional areas of both chambers 62A and 63A, as described in the foregoing description. Hence, the spool 61A is shifted rightward by the spring 6AS and stopped at the right position in the first shift valve 6A so that the fluid communication path is continuously established between output port 65A and drain port 64A, thereby draining pressurized oil away from the brake B1.

Furthermore, the fluid communication path established between drain port 67 and output port 68 in the second shift valve 6B allows any pressurized oil to drain away from the brake B3.

With the above arrangement, the 5th speed of the "H" range is realized. In other words, the 5th speed mode of the H range is established when all of electromagnetic valves 5A, 5B and 5C are turned on, as shown in FIG. 16.

1st speed (L-1) mode in "L" range

Figure 14:
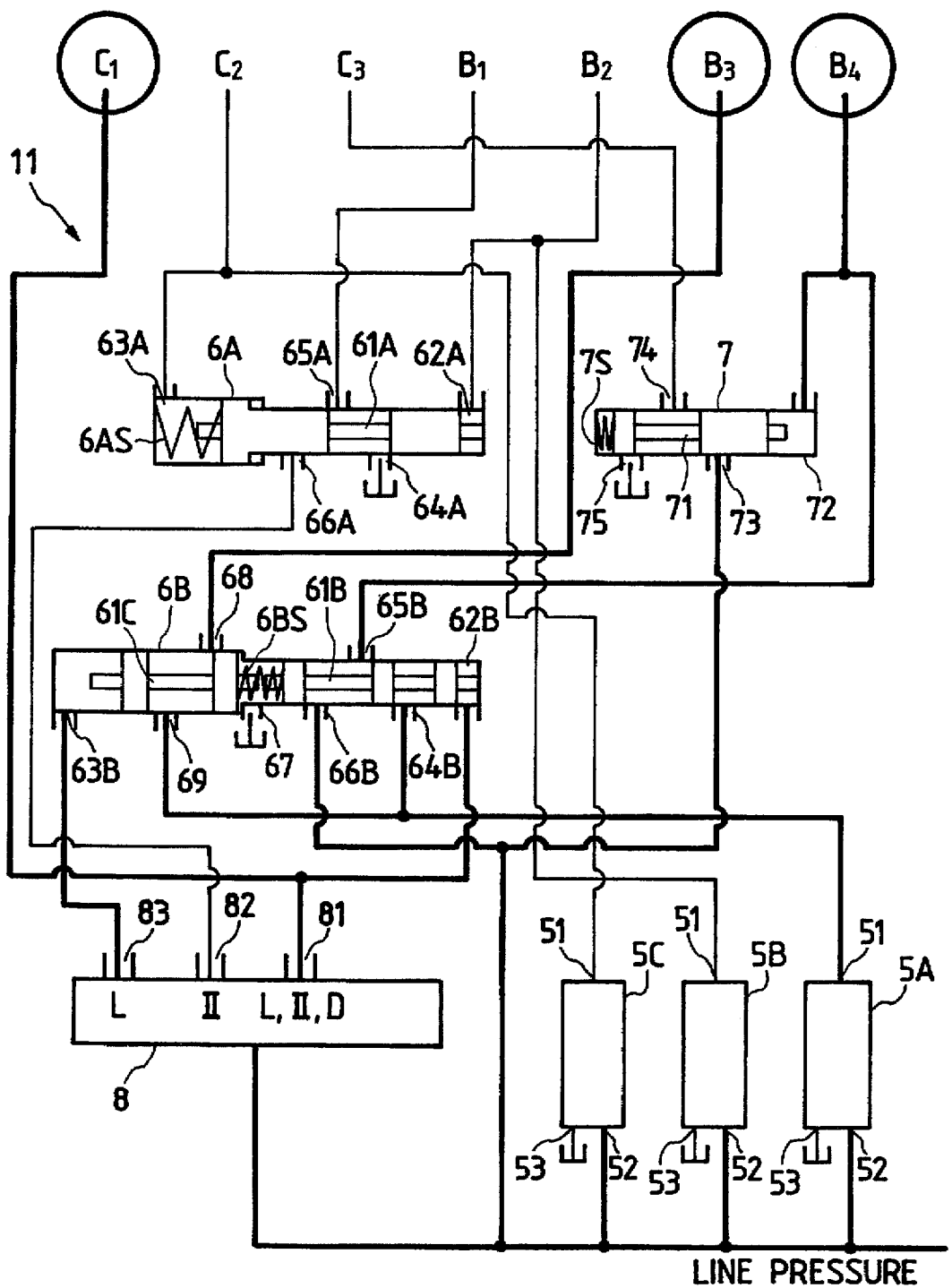
FIG. 14 is a hydraulic circuit diagram showing the delivery of hydraulic pressure to respective friction devices in a 1st (L-1) mode of "L" range in the hydraulic control system shown in FIG. 3.

Referring now to FIG. 14, an establishment of a 1st speed (i.e. L-1) mode of the L range will be explained. When the shift lever is positioned in the "L" range, line pressure is delivered from output port 83 as well as output port 81. More specifically, the line pressure is directly delivered to the clutch C1 from the output port 81 of the manual shift valve 8. Meanwhile, line pressure is applied to the right and left pressure chambers 62B and 63B in the second shift valve 6B.

In this case, due to imbalance of cross sections of right and left pressure chambers 62B and 63B, the pressing force acting from the left pressure chamber 63B overcomes the other pressing force acting from the right pressure chamber 62B.

$$P_L \cdot S_{bl} > P_L \cdot S_{br}$$

where $P_L$ represents line pressure, $S_{bl}$ represents a cross-sectional area of the left pressure chamber 63B and $S_{br}$ represents a cross-sectional area of the right pressure chamber 62B.

Thus, the spools 61B and 61C move together right in the second shift valve 6B so that fluid communication path is established between output port 65B and input port 66B, and between output port 68 and input port 69 in the second shift valve 6B. Thus, pressurized oil (i.e. line pressure) is supplied to brake B4 via input and output ports 66B and 65B of the second shift valve 6B. Furthermore, as electromagnetic valve 5A is activated (i.e. turned on) in this case, pressurized oil (i.e. line pressure) is also supplied to brake B3 via input and output ports 69 and 68 of the second shift valve 6B from electromagnetic valve 5A.

In this condition, line pressure applied to the brake B4 is also delivered to the pressure chamber 72 of the third shift valve 7. Hence, the spool 71 is moved left against the resilient force of the spring 7S so that output port 74 is communicated with drain port 75 to release any hydraulic pressure acting on the clutch C3. As other electromagnetic valves 5B and 5C are deactivated (i.e. turned off) at this moment, no hydraulic pressure is applied to the brake B2 and clutch C2. Furthermore, a fluid communication path established between drain port 64A and output port 65A in the first shift valve 6A allows any pressurized oil to drain away from the brake B1.

With the above arrangement, the 1st speed of the "L" range is realized. In other words, the 1st speed mode of the L range is established when one electromagnetic valve 5A is turned on while other electromagnetic valves 5B and 5C are turned off, as shown in FIG. 16.

3rd speed (L-3) mode in "L" range

Figure 15:
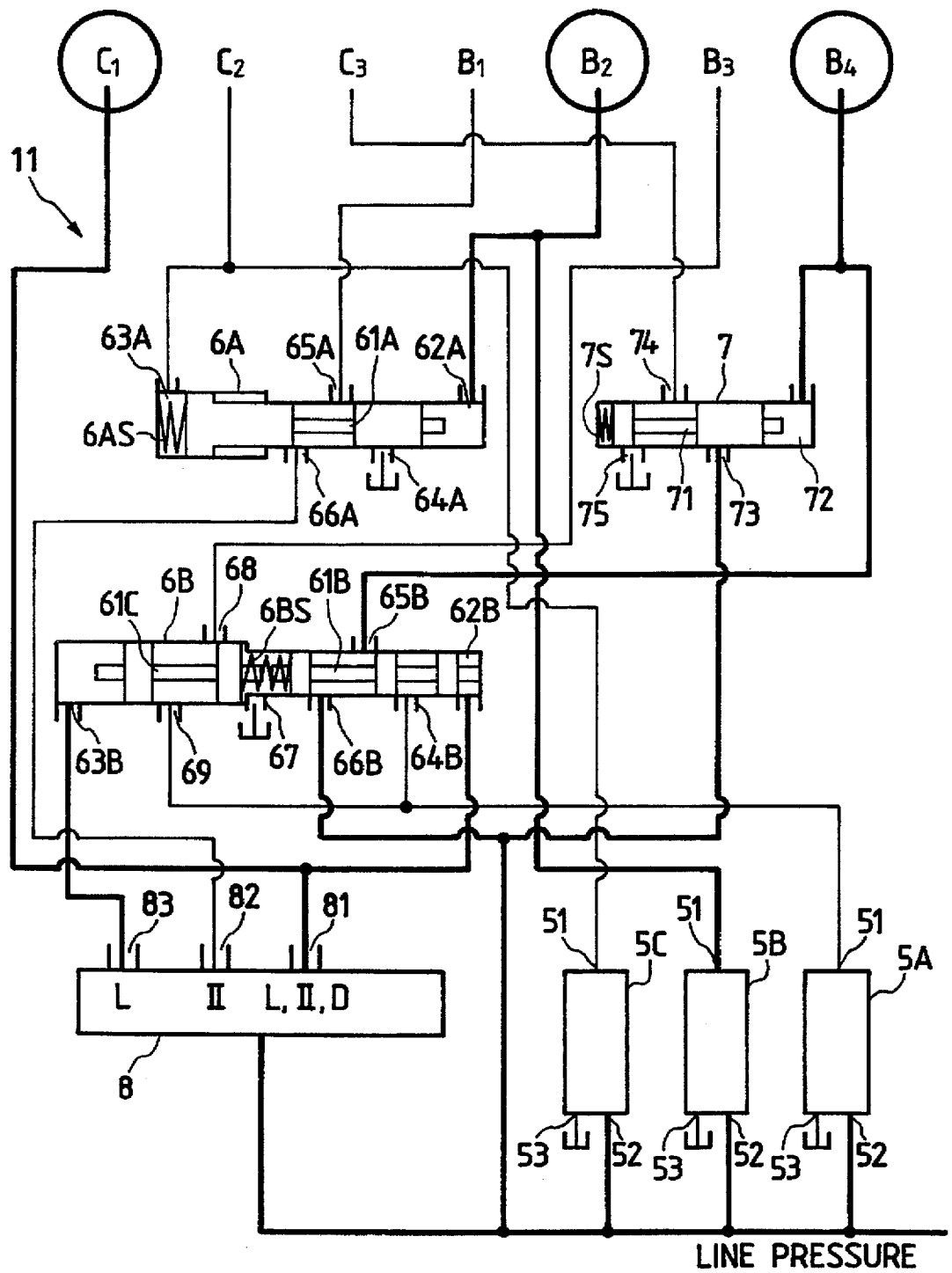
FIG. 15 is a hydraulic circuit diagram showing the delivery of hydraulic pressure to respective friction devices in a 3rd (L-3) mode of "L" range in the hydraulic control system shown in FIG. 3.

Referring now to FIG. 15, an establishment of a 3rd speed (i.e. L-3) mode of the L range will be explained. As long as the shift lever is positioned in the same "L" range, line pressure is continuously delivered directly to the clutch C1 from the output port 81 of the manual shift valve 8. Meanwhile, line pressure is also applied to the right and left pressure chambers 62B and 63B in the second shift valve 6B.

As explained above, the pressing force acting from the left pressure chamber 63B overcomes the other pressing force acting from the right pressure chamber 62B due to imbalance of cross sections of right and left pressure chambers 62B and 63B, according to the inequality $P_L \cdot S_{bl} > P_L \cdot S_{br}$.

Thus, the spools 61B and 61C maintain the same (right) position in the second shift valve 6B so that fluid communication path is established between output port 65B and input port 66B, and between output port 68 and input port 69 in the second shift valve 6B. Thus, pressurized oil (i.e. line pressure) is supplied to brake B4 via input and output ports 66B and 65B of the second shift valve 6B.

In this condition, line pressure applied to the brake B4 is also delivered to the pressure chamber 72 of the third shift valve 7. Hence, the spool 71 is held left in the third shift valve 7 against the resilient force of the spring 7S so that output port 74 is communicated with drain port 75 to release any hydraulic pressure acting on the clutch C3.

Meanwhile, the fluid communication path established between input port 69 and output port 68 in the second shift valve 6B allows any pressurized oil to drain away from the brake B3 via drain port 53 of deactivated electromagnetic valve 5A.

Furthermore, as electromagnetic valve 5B is activated (i.e. turned on) in this case, pressurized oil (i.e. line pressure) is supplied to brake B2 from electromagnetic valve 5B. The pressurized oil applied to the brake B2 is also delivered to right chamber 62A of first shift valve 6A so as to shift the spool 61A left in the first shift valve 6A. Thus, a fluid communication path is established between input port 66A and output port 65A. Input port 66A of first shift valve 6A is connected to output port 82 of manual shift valve 8 which is in a drain condition. Hence, any hydraulic pressure is released from brake B1.

The remaining electromagnetic valve 5C is still deactivated (i.e. turned off), therefore no hydraulic pressure is applied to the clutch C2.

With the above arrangement, the 3rd speed of the "L" range is realized. In other words, the 3rd speed mode of the L range is established when one electromagnetic valve 5B is turned on while other remaining electromagnetic valves 5A and 5C are turned off, as shown in FIG. 16.

In this manner, by providing the mechanical shift valve 6B which is operable in response to line pressure supplied from output ports 81 and 83 of the manual shift valve 8, the present invention makes it possible to establish 1st and 3rd speeds of "L" range by using electromagnetic valves 5A through 5C as well as "D" range.

Miscellaneous

It is further possible to increase speeds by adequately operating electromagnetic valves so as to add two, i.e. 2nd and 4th, speeds in the "H" range and also one more, i.e. 2nd, speed in the "L" range without changing the hydraulic circuit.

Furthermore, the present invention activates or deactivates the electromagnetic valves 5A through 5C using duty control. Accordingly, it becomes possible to precisely absorb shift shocks without using accumulators in the hydraulic circuit.

As explained above, the automatic transmission in accordance with the present invention provides a simple hydraulic circuit structure capable of providing multiple speeds, as well as quick and smooth shift changes, thereby improving drivability and fuel economy of vehicles.

As this invention may be embodied in several forms without departing from the spirit of essential characteristics thereof, the present embodiment described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An automatic transmission for an automotive vehicle comprising:
    a manual shift valve operable in response to a shift operation;
    electromagnetic valves activated or deactivated in accordance with a given shift schedule determined based on traveling conditions of the automotive vehicle;
    a plurality of planetary gear trains driven by an output force of an engine;
    a plurality of friction devices receiving hydraulic pressure to selectively connect or disconnect components constituting said planetary gear trains, so as to obtain a desirable driving force;
    a mechanical shift valve having a pair of pressure chambers and plural ports, one of said pressure chambers upon application of hydraulic pressure therein establishing a fluid communicating path in said mechanical shift valve based on a predetermined combination of said ports so as to connect at least one of said friction devices with at least one of said electromagnetic valves and said manual shift valve, the other of said pressure chambers upon application of hydraulic pressure therein canceling said fluid communication path and establishing another fluid communication path in said mechanical shift valve based on another combination of said ports so as to provide a different connection between at least one of friction devices and at least one of said electromagnetic valve and said manual shift valve; and
    a control means for activating and deactivating said electromagnetic valves so as to control supply or release of hydraulic pressure to or from said friction devices and said pressure chambers of said mechanical shift valve.

2. The automatic transmission for an automotive vehicle defined by claim 1, wherein said one pressure chamber of said mechanical shift valve has a cross-sectional area smaller than that of said the other pressure chamber of said mechanical shift valve.

3. The automatic transmission for an automotive vehicle defined by claim 1, wherein application of hydraulic pressure to said pressure chambers of said mechanical shift valve is controlled by said electromagnetic valves.

4. The automatic transmission for an automotive vehicle defined by claim 1, further comprises
    another mechanical shift valve having a pair of pressure chambers and plural ports, one pressure chamber upon application of hydraulic pressure therein establishing a fluid communicating path in said another mechanical shift valve based on a predetermined combination of said ports so as to connect at least one of said friction devices with at least one of said electromagnetic valves and said manual shift valve, and the other pressure chamber upon application of hydraulic pressure therein canceling said fluid communication path and establishing another fluid communication path in said another mechanical shift valve based on another combination of said ports so as to provide a different connection between at least one of said friction devices and at least one of said electromagnetic valves and said manual shift valve.

5. The automatic transmission for an automotive vehicle defined by claim 4, wherein application of hydraulic pressure to said pressure chambers of said another mechanical shift valve is controlled by said manual shift valve.

6. The automatic transmission for an automotive vehicle defined by claim 4, wherein said one pressure chamber of said another mechanical shift valve has a cross-sectional area smaller than that of said the other pressure chamber of said another mechanical shift valve.

7. The automatic transmission for an automotive vehicle defined by claim 4, wherein said another mechanical shift valve accommodates two spools connected by means of a resilient member, one spool being shiftable in response to a pressing force acting from said one pressure chamber of said another mechanical shift valve while the other spool being shiftable in response to a pressing force acting from said the other pressure chamber of said another mechanical shift valve.

8. The automatic transmission for an automotive vehicle defined by claim 1, wherein said control means activates or deactivates said electromagnetic valves using duty control.

9. An automatic transmission for an automotive vehicle comprising:
    a manual shift valve operable in response to a shift operation;
    a total of three electromagnetic valves activated or deactivated in accordance with a given shift schedule determined based on traveling conditions of the automotive vehicle;
    a total of three planetary gear trains driven by an output force of an engine;
    a plurality of friction devices including a total of three clutches and a total of four brakes receiving hydraulic pressure to selectively connect or disconnect components constituting said planetary gear trains, so as to obtain a desirable driving force;
    a first mechanical shift valve having first and second pressure chambers and plural ports, said first pressure chamber upon application of hydraulic pressure therein establishing a first fluid communicating path in said first mechanical shaft valve based on a predetermined combination of ports of said first mechanical shift valve so as to connect at least one of said friction devices with at least one of said electromagnetic valves and said manual shift valve, said second pressure chamber upon application of hydraulic pressure therein canceling said first fluid communication path and establishing a second fluid communication path in said first mechanical shift valve based on another combination of said ports of said first mechanical shift valve so as to provide a different connection between at least one of said friction devices and at least one of said electromagnetic valves and said manual shift valve;

a second mechanical shift valve having third and fourth pressure chambers and plural ports, said third pressure chamber upon application of hydraulic pressure therein establishing a third fluid communication path in said second mechanical shift valve based on a predetermined combination of said ports of said second mechanical shift valve so as to connect at least one of said friction devices with at least one of electromagnetic valves and said manual shift valve, said fourth pressure chamber upon application of hydraulic pressure therein canceling said third fluid communication path and establishing a fourth fluid communication path in said second mechanical shift valve based on another combination of said ports of said second mechanical shift valve so as to provide a different connection between at least one of said friction devices and at least one of said electromagnetic valve and said manual shift valve; and a control means for activating and deactivating said electromagnetic valves so as to control supply or release of hydraulic pressure to or from said friction devices and said pressure chambers of said first and second mechanical shift valves.

10. The automatic transmission for an automotive vehicle defined by claim 9, wherein said first pressure chamber of said first mechanical shift valve has a cross-sectional area smaller than that of said second pressure chamber of said first mechanical shift valve.

11. The automatic transmission for an automotive vehicle defined by claim 9, wherein said third pressure chamber of said second mechanical shift valve has a cross-sectional area smaller than that of said fourth pressure chamber of said second mechanical shift valve.

12. The automatic transmission for an automotive vehicle defined by claim 9, wherein application of hydraulic pressure to said first and second pressure chambers of said first mechanical shift valve is controlled by said electromagnetic valves.

13. The automatic transmission for an automotive vehicle defined by claim 9, wherein application of hydraulic pressure to said third and fourth pressure chambers of said second mechanical shift valve is controlled by said manual shift valve.

14. The automatic transmission for an automotive vehicle defined by claim 9, wherein said second mechanical shift valve accommodates two spools connected by means of a resilient member, one spool being shiftable in response to a pressing force acting from said third pressure chamber of said second mechanical shift valve while the other spool being shiftable in response to a pressing force acting from said fourth pressure chamber of said second mechanical shift valve.

15. The automatic transmission for an automotive vehicle defined by claim 9, wherein said control means activates or deactivates said electromagnetic valves using duty control.

16. The automatic transmission for an automotive vehicle defined by claim 9, further comprises a third mechanical shift valve having a single pressure chamber.

17. The automatic transmission for an automotive vehicle defined by claim 16, wherein said control means provides a total of six speeds in a same range of said manual shift valve by changing combination of activation of said electromagnetic valves.

18. The automatic transmission for an automotive vehicle defined by claim 9, wherein said manual shift valve has one range supplying line pressure to said third pressure chamber of said second shift valve and another range supplying line pressure to both of said third and fourth pressure chambers of said second shift valve.

19. An automatic transmission for an automotive vehicle which comprises first, second and third friction devices and selectively engages or disengages said first, second and third friction devices to obtain predetermined speed ratios, said automatic transmission comprising:

at least one electromagnetic valve receiving a line pressure for adjusting a hydraulic pressure supplied to said friction devices;

a manual shift valve operable in response to a shift operation for switching a line pressure supply path formed therein between a first position and a second position in accordance with said shift operation;

a first mechanical shift valve with a pair of pressure chambers, having a first hydraulic pressure supply path formed therein, said first mechanical shift valve being switchable in response to hydraulic pressures supplied to said pair of pressure chambers, said first hydraulic pressure supply path connecting said first electromagnetic valve with said first friction device when said manual shift valve is positioned at said first position to supply the line pressure to both of said pair of pressure chambers, while said first hydraulic pressure supply path connects said first electromagnetic valve with said second friction device when said manual shift valve is positioned at said second position to supply the line pressure to only one of said pair of pressure chambers; and a second mechanical shift valve with a single pressure chamber, having a second hydraulic pressure supply path formed therein, said second mechanical shift valve being switchable in response to a hydraulic pressure supplied to said single pressure chamber, said second hydraulic pressure supply path selectively communicating with said third friction device in response to said hydraulic pressure supplied to said single pressure chamber.

20. The automatic transmission for an automotive vehicle defined by claim 19, wherein said one of said pressure chambers of said first mechanical shift valve has a cross-sectional area smaller than that of the other of said pressure chambers of said first mechanical shift valve.

21. The automatic transmission for an automotive vehicle defined by claim 19, wherein application of hydraulic pressure to said pressure chambers of said first mechanical shift valve is controlled by said electromagnetic valve.

* * * * *